United States Patent
Chabrecek et al.

(10) Patent No.: US 6,447,920 B1
(45) Date of Patent: Sep. 10, 2002

(54) ORGANIC ARTICLES

(75) Inventors: Peter Chabrecek, Riehen (CH); Jens Höpken, Lörrach (DE); Dieter Lohmann, Münchenstein (CH)

(73) Assignee: Novartis AG, Basel (SE)

(*) Notice: Subject to any disclaimer, the term of this patent is extended or adjusted under 35 U.S.C. 154(b) by 0 days.

(21) Appl. No.: 09/697,860

(22) Filed: Oct. 27, 2000

Related U.S. Application Data

(63) Continuation of application No. PCT/EP99/02880, filed on Apr. 28, 1999.

(30) Foreign Application Priority Data

Apr. 30, 1998 (EP) ............................................. 98810385

(51) Int. Cl.$^7$ .............................. G02C 7/04; G02B 1/10
(52) U.S. Cl. ................... 428/423.1; 428/500; 427/2.24; 427/164; 427/487; 351/160 R
(58) Field of Search ................................. 428/520, 515, 428/522, 500, 423.1; 564/32, 48, 49; 351/160 R; 427/2.24, 487, 488, 491, 164, 508

(56) References Cited

U.S. PATENT DOCUMENTS 5,693,768 A * 12/1997 Bachmann et al. .......... 536/4.1
6,087,412 A * 7/2000 Chabrecek et al. ............ 522/35
6,099,122 A * 8/2000 Chabrecek et al. ..... 351/160 H
6,204,306 B1 * 3/2001 Chabrecek et al. ......... 523/106

FOREIGN PATENT DOCUMENTS

| EP | 0 632 A1 | 6/1994 |
| WO | WO 96/20795 | 7/1996 |
| WO | WO 96/20796 | 7/1996 |
| WO | WO 96/20919 | 7/1996 |
| WO | WO-99/57581 A1 * | 11/1999 |

* cited by examiner

Primary Examiner—D. Lawrence Tarazano
(74) Attorney, Agent, or Firm—R. Scott Meece; Jian S. Zhou; Richard Gearhart

(57) ABSTRACT

The invention relates to novel composite materials comprising (a) an inorganic or organic bulk material having covalently bound to its surface initiator moieties for radical polymerization; and (b) a hydrophilic surface coating obtainable by applying one or more different ethylenically unsaturated hydrophilic macromonomers of formula (1) as outlined in the claims to the bulk material surface provided with the initiator radicals and polymerizing said macromonomers. The composite materials of the invention have desirable characteristics regarding adherence to the substrate, durability, hydrophilicity, wettability, biocompatibility and permeability and are thus useful for the manufacture of biomedical articles such as ophthalmic devices.

31 Claims, No Drawings

ORGANIC ARTICLES

This is is a continuation of International Application No. PCT/EP99/02880, filed Apr. 28, 1999, the contents of which are incorporated herein by reference.

The present invention relates to coated articles wherein the coating comprises a polymer having desirable characteristics regarding adherence to the substrate, durability, hydrophilicity, wettability, biocompatibility and permeability. More particular, the present invention relates to an article, such as a biomedical material or article, especially a contact lens including an extended-wear contact lens which is at least partly coated with a polymer having a "bottle-brush" type structure composed of tethered "hairy" chains. The inventive coatings are obtainable by grafting specific ethylenically unsaturated macromonomers onto the surface of a substrate which has been previously provided with initiator groups.

A variety of different types of processes for preparing polymeric coatings on a substrate have been disclosed in the prior art. For example, U.S. Pat. No. 5,527,925 describes functionalized photoinitiators and also organic substrates such as contact lenses containing said photoinitiators covalently bound to their surface. In one embodiment of said disclosure, the so modified surface of the contact lens is further coated with a photopolymerizable ethylenically unsaturated monomer which is then polymerized by irradiation thus forming a novel substrate surface. With this method, however, it is not always possible to obtain the desired coating characteristics, for example wettability characteristics which are necessary for the surface of biomedical devices including contact lenses. In particular, the ability of the known materials to hold a continuous layer of an aqueous solution, e.g. human body fluids such as tears or mucus layers, for a prolonged period of time which is an important feature for many biomedical applications is not yet satisfactory.

Surprisingly, it now has been found that articles, particularly biomedical devices such as contact lenses, with an improved wettability, water-retention ability and biocompatibility are obtained by first of all providing the article surface with covalently bound photoinitiator molecules, coating the modified surface with a layer of one or more different polymerizable macromonomers and then subjecting it to heat or radiation whereby the macromonomer is graft polymerized thus forming the novel article surface.

The present invention therefore in one aspect relates to a composite material comprising
(a) an inorganic or organic bulk material having covalently bonded to its surface initiator moieties for radical polymerization; and
(b) a hydrophilic surface coating obtainable by applying one or more different ethylenically unsaturated hydrophilic macromonomers to the bulk material surface provided with the initiator radicals and polymerizing said macromonomers,
wherein the macromonomers are each of formula

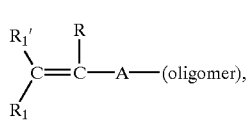 (1)

$R_1$ is hydrogen, $C_1$–$C_6$-alkyl or a radical —COOR';
R, R' and $R_1'$ are each independently of the other hydrogen or $C_1$–$C_6$-alkyl;

A is a direct bond or is a radical of formula

 (2a)

or

 (2b);

or

 (2c)

or

 (2d);

or

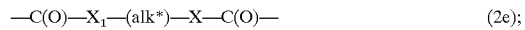 (2e);

or

A and $R_1$, together with the adjacent double bond, are a radical of formula

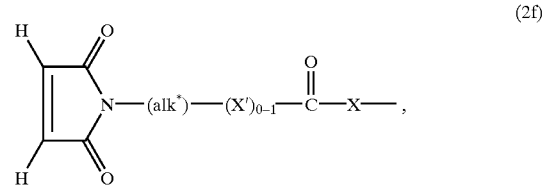 (2f)

$A_1$ is —O—$C_2$–$C_{12}$-alkylene which is unsubstituted or substituted by hydroxy, or is —O—$C_2$–$C_{12}$-alkylene-NH—C(O)— or —$C_2$–$C_{12}$-alkylene-O—C(O)—NH—$R_{11}$—NH—C(O)—, wherein $R_{11}$ is linear or branched $C_1$–$C_{18}$-alkylene or unsubstituted or $C_1$–$C_4$-alkyl- or $C_1$–$C_4$-alkoxy-substituted $C_6$–$C_{10}$-arylene, $C_7$–$C_{18}$-aralkylene, $C_6$–$C_{10}$-arylene-$C_1$–$C_2$-alkylene-$C_6$–$C_{10}$-arylene, $C_3$–$C_8$-cycloalkylene, $C_3$–$C_8$-cycloalkylene-$C_1$–$C_6$-alkylene, $C_3$–$C_8$-cycloalkylene-$C_1$–$C_2$-alkylene-$C_3$–$C_8$-cycloalkylene or $C_1$–$C_6$-alkylene-$C_3$–$C_8$-cycloalkylene-$C_1$–$C_6$-alkylene;
$A_2$ is $C_1$–$C_8$-alkylene; phenylene or benzylene;
m and n are each independently of the other the number 0 or 1;
X, $X_1$ and X' are each independently of the other a bivalent group —O— or —NR", wherein R" is hydrogen or $C_1$–$C_6$-alkyl;
(alk*) is $C_2$–$C_{12}$-alkylene;
and (oligomer) denotes
(i) the radical of a telomer of formula

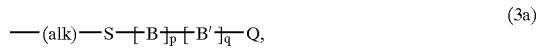 (3a)

wherein
(alk) is $C_2$–$C_{12}$-alkylene,
Q is a monovalent group that is suitable to act as a polymerization chain-reaction terminator,
p and q are each independently of another an integer from 0 to 100, wherein the total of (p+q) is an integer from 2 to 250,
and B and B' are each independently of the other a 1,2-ethylene radical derivable from a copolymerizable vinyl monomer by replacing the vinylic double bond by a single bond, at least one of the radicals B and B' being substituted by a hydrophilic substituent; or (ii) the radical of an oligomer of the formula

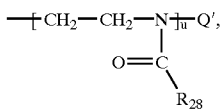
(3b)

wherein $R_{28}$ is hydrogen or unsubstituted or hydroxy-substituted $C_1$–$C_{12}$-alkyl, u is an integer from 2 to 250 and Q' is a radical of a polymerization initiator; or (iii) the radical of formula

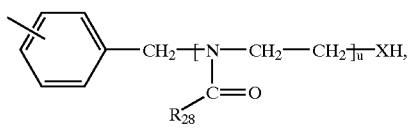
(3b')

wherein
$R_{28}$, X and u are as defined above, or (iv) the radical of an oligomer of formula

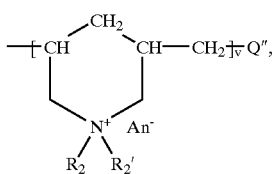
(3c)

wherein $R_2$ and $R_2'$ are each independently $C_1$–$C_4$-alkyl, An_ is an anion, v is an integer from 2 to 250, and Q" is a monovalent group that is suitable to act as a polymerization chain-reaction terminator; or (v) the radical of an oligopeptide of formula

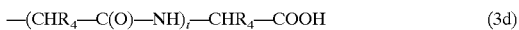
(3d)

or

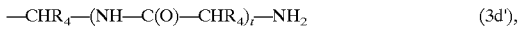
(3d'), wherein $R_4$ is hydrogen or $C_1$–$C_4$-alkyl which is unsubstituted or substituted by hydroxy, carboxy, carbamoyl, amino, phenyl, o-, m- or p-hydroxyphenyl, imidazolyl, indolyl or a radical —NH—C(=NH)—$NH_2$ and t is an integer from 2 to 250, or the radical of an oligopeptide based on proline or hydroxyproline; subject to the provisos that A is not a direct bond if (oligomer) is a radical of formula (3a);

A is a radical of formula (2a), (2b) or (2d) or A and $R_1$, together with the adjacent double bond, are a radical of formula (2f) if (oligomer) is a radical of formula (3b), (3c) or (3d);

A is a direct bond if (oligomer) is a radical of formula (3b'); and

A is a radical of formula (2c) or (2e) if (oligomer) is a radical of formula (3d').

Examples of suitable bulk materials are quartz, ceramics, glasses, silicate minerals, silica gels, metals, metal oxides, carbon materials such as graphite or glassy carbon, natural or synthetic organic polymers, or laminates, composites or blends of said materials, in particular natural or synthetic organic polymers which are known in large number. Some examples of polymers are polyaddition and polycondensation polymers (polyurethanes, epoxy resins, polyethers, polyesters, polyamides and polyimides); vinyl polymers (poly-acrylates, polymethacrylates, polystyrene, polyethylene and halogenated derivatives thereof, polyvinyl acetate and polyacrylonitrile); elastomers (silicones, polybutadiene and polyisoprene); or modified or unmodified biopolymers (collagen, cellulose, chitosan and the like).

A preferred group of bulk materials are those being conventionally used for the manufacture of biomedical devices, e.g. contact lenses, in particular contact lenses for extended wear, which are not hydrophilic per se. Such materials are known to the skilled artisan and may comprise for example polysiloxanes, perfluoropolyethers, fluorinated poly(meth)acrylates or equivalent fluorinated polymers derived e.g. from other polymerizable carboxylic acids, polyalkyl (meth)acrylates or equivalent alkylester polymers derived from other polymerizable carboxylic acids, or fluorinated polyolefines, such as fluorinated ethylene propylene, or tetrafluoroethylene, preferably in combination with specific dioxols, such as perfluoro-2,2-dimethyl-1,3-dioxol. Examples of suitable bulk materials are e.g. Lotrafilcon A, Neofocon, Pasifocon, Telefocon, Silafocon, Fluorsilfocon, Paflufocon, Silafocon, Elastofilcon, Fluorofocon or Teflon AF materials, such as Teflon AF 1600 or Teflon AF 2400 which are copolymers of about 63 to 73 mol % of perfluoro-2,2-dimethyl-1,3-dioxol and about 37 to 27 mol % of tetrafluoroethylene, or of about 80 to 90 mol % of perfluoro-2,2-dimethyl-1,3-dioxol and about 20 to 10 mol % of tetrafluoroethylene.

Another preferred group of bulk materials are those being conventionally used for the manufacture of biomedical devices, e.g. contact lenses, which are hydrophilic per se, since reactive groups, e.g. carboxy, carbamoyl, sulfate, sulfonate, phosphate, amine, ammonium or hydroxy groups, are inherently present in the bulk material and therefore also at the surface of a biomedical device manufactured therefrom. Such materials are known to the skilled artisan and comprise for example polyhydroxyethyl acrylate, polyhydroxyethyl methacrylate (HEMA), polyvinyl pyrrolidone (PVP), polyacrylic acid, polymethacrylic acid, polyacrylamide, polydimethylacrylamide (DMA), polyvinyl alcohol or copolymers for example from two or more monomers from the group hydroxyethyl acrylate, hydroxyethyl methacrylate, N-vinyl pyrrolidone, acrylic acid, methacrylic acid, acrylamide, dimethyl acrylamide, vinyl alcohol and the like. Typical examples are e.g. Polymacon, Tefilcon, Methafilcon, Deltafilcon, Bufilcon, Phemfilcon, Ocufilcon, Focofilcon, Etafilcon, Hefilcon, Vifilcon, Tetrafilcon, Perfilcon, Droxifilcon, Dimefilcon, Isofilcon, Mafilcon, Nelfilcon or Atlafilcon.

Still another group of preferred bulk materials are amphiphilic segmented copolymers comprising at least one hydrophobic segment and at least one hydrophilic segment which are linked through a bond or a bridge member. Examples are silicone hydrogels, for example those disclosed in PCT applications WO 96/31792 and WO 97/49740 which are herewith incorporated by reference.

The bulk material may also be any blood-contacting material conventionally used for the manufacture of renal dialysis membranes, blood storage bags, pacemaker leads or vascular grafts. For example, the bulk material may be a polyurethane, polydimethylsiloxane, polytetrafluoroethylene, polyvinylchloride, Dacron®

(ethyleneglycol terephthalic acid) polyester, or composite made therefrom.

Moreover, the bulk material may also be an inorganic or metallic base material with or without suitable reactive groups, e.g. ceramic, quartz, or metals, such as silicon or gold, or other polymeric or non-polymeric substrates. E.g. for implantable biomedical applications, ceramics or carbohydrate containing materials such as polysaccharides are very useful. In addition, e.g. for biosensor purposes, dextran coated base materials are expected to reduce nonspecific binding effects if the structure of the coating is well controlled. Biosensors may require polysaccharides on gold, quartz, or other non-polymeric substrates.

The form of the bulk material may vary within wide limits. Examples are particles, granules, capsules, fibres, tubes, films or membranes, preferably moldings of all kinds such as ophthalmic moldings, in particular contact lenses.

In the initial state, the bulk material carries initiator moieties for radical polymerization covalently bonded to its surface. According to a preferred embodiment of the invention, the initiator moieties are covalently bonded to the surface of the bulk material via reaction of a functional group of the bulk material surface with a reactive group of the initiator molecule.

Suitable functional groups may be inherently (a priori) present at the surface of the bulk material. If substrates contain too few or no reactive groups, the bulk material surface can be modified by methods known per se, for example plasma chemical methods (see, for example, WO 94/06485), or conventional functionalization with groups such as —OH, —$NH_2$ or —$CO_2H$ produced. Suitable functional groups may be selected from a wide variety of groups well known to the skilled artisan. Typical examples are e.g. hydroxy groups, amino groups, carboxy groups, carbonyl groups, aldehyde groups, sulfonic acid groups, sulfonyl chloride groups, isocyanato groups, carboxy anhydride groups, lactone groups, azlactone groups, epoxy groups and groups being replaceable by amino or hydroxy groups, such as halo groups, or mixtures thereof. Amino groups and hydroxy groups are preferred.

Polymerization initiators bonded on the surface of the bulk material are typically those that are initiating a radical polymerization of ethylenically unsaturated compounds. The radical polymerization may be induced thermally, or preferably by irradiation.

Suitable thermal polymerization initiators are known to the skilled artisan and comprise for example peroxides, hydroperoxides, azo-bis(alkyl- or cycloalkylnitriles), persulfates, percarbonates or mixtures thereof. Examples are benzoylperoxide, tert.-butyl peroxide, di-tert.-butyl-diperoxyphthalate, tert.-butyl hydroperoxide, azo-bis (isobutyronitrile), 1,1'-azo-bis(1-cyclohexanecarbonitrile), 2,2'-azo-bis(2,4-dimethylvaleronitrile) and the like. The thermal initiators may be linked to the surface of the bulk material by methods known per se, for example as disclosed in EP-A-0378511.

Initiators for the radiation-induced polymerization are particularly functional photoinitiators having a photoinitiator part and in addition a functional group that is coreactive with functional groups of the substrate, particularly with —OH, —SH, —$NH_2$, epoxy, carboxanhydride, alkylamino, —COOH or isocyanato groups. The photoinitiator part may belong to different types, for example to the thioxanthone type and preferably to the benzoin type. Suitable functional groups that are coreactive with the surface of the bulk material are for example a carboxy, hydroxy, epoxy or isocyanato group.

Preferred polymerization initiators for use in the present invention are the photoinitiators of formulae (I) and (Ia) as disclosed in U.S. Pat. No. 5,527,925, those of the formula (I) as disclosed in PCT application WO 96/20919, or those of formulae II and III including formulae IIa-IIy and LLg as disclosed in EP-A-0281941, particularly formulae IIb, IIi, IIm, IIn, IIp, IIr, IIs, IIx and IIIg therein. The respective portion of said three documents including the definitions and preferences given for the variables in said formulae are herewith included by reference.

The polymerization initiator moieties are preferably derived from a functional photoinitiator of the formula

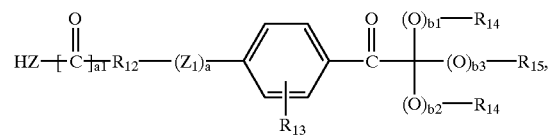

(10a)

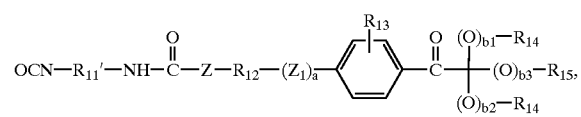

(10b)

or

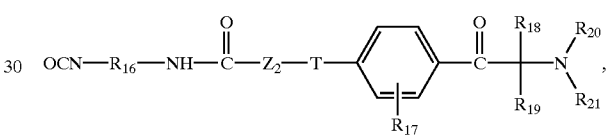

(10c)

wherein Z is bivalent —O—, —NH— or —$NR_{22}$—; $Z_1$ is —O—, —O—(O)C—, —C(O)—O— or —O—C(O)—O—; $R_{13}$ is H, $C_1$–$C_{12}$-alkyl, $C_1$–$C_{12}$-alkoxy or N—$C_1$–$C_{12}$-alkylamino; $R_{14}$ and $R_{15}$ are each independently of the other H, linear or branched $C_1$–$C_8$-alkyl, $C_1$–$C_8$-hydroxyalkyl or $C_6$–$C_{10}$-aryl, or the groups $R_{14}$—(O)$_{b1}$— and $R_{14}$—(O)$_{b2}$— together are —(CH$_2$)$_c$— wherein c is an integer from 3 to 5, or the groups $R_{14}$—(O)$_{b1}$—, $R_{14}$—(O)$_{b2}$— and $R_{15}$—(O$_1$)$_{b3}$— together are a radical of the formula

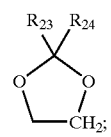

$R_{12}$ is a direct bond or linear or branched $C_1$–$C_8$-alkylene that is unsubstituted or substituted by —OH and/or is uninterrupted or interrupted by one or more groups —O—, —O—C(O)— or —O—C(O)—O—; $R_{11}'$ is branched $C_3$–$C_{18}$-alkylene, unsubstituted or $C_1$–$C_4$-alkyl- or $C_1$–$C_4$-alkoxy-substituted $C_6$–$C_{10}$-arylene, or unsubstituted or $C_1$–$C_4$-alkyl- or $C_1$–$C_4$-alkoxy-substituted $C_7$–$C_{18}$-aralkylene, unsubstituted or $C_1$–$C_4$-alkyl- or $C_1$–$C_4$-alkoxy-substituted $C_3$–$C_8$-cycloalkylene, unsubstituted or $C_1$–$C_4$-alkyl- or $C_1$–$C_4$-alkoxy-substituted $C_3$–$C_8$-cycloalkylene-$C_yH_y$— or unsubstituted or $C_1$–$C_4$-alkyl- or $C_1$–$C_4$-alkoxy-substituted —$C_yH_{2y}$—($C_3$–$C_8$-cycloalkylene)-$C_yH_{2y}$— wherein y is an integer from 1 to 6; $R_{16}$ independently has the same definitions as $R_{11}'$ or is linear $C_3$–$C_{18}$-alkylene; $R_{22}$ is linear or branched $C_1$–$C_6$-alkyl; T is bivalent —O—, —NH—, —S—, $C_1$–$C_8$-alkylene or

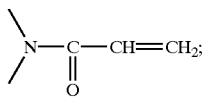

$Z_2$ is a direct bond or —O—$(CH_2)_d$— wherein d is an integer from 1 to 6 and the terminal $CH_2$ group of which is linked to the adjacent T in formula (10c); $R_{17}$ is H, $C_1$–$C_{12}$-alkyl, $C_1$–$C_{12}$-alkoxy, N—$C_1$–$C_{12}$-alkylamino or —$NR_{25}R_{26}$ wherein $R_{25}$ is $C_1$–$C_8$-alkyl and $R_{26}$ is H or $C_1$–$C_8$-alkyl; $R_{18}$ is linear or branched $C_1$–$C_8$-alkyl, $C_2$–$C_8$-alkenyl or $C_6$–$C_{10}$-aryl-$C_1$–$C_8$-alkyl; $R_{19}$ independently of $R_{18}$ has the same definitions as $R_{18}$ or is $C_6$–$C_{10}$-aryl, or $R_{18}$ and $R_{19}$ together are —$(CH_2)_e$— wherein e is an integer from 2 to 6; $R_{20}$ and $R_{21}$ are each independently of the other linear or branched $C_1$–$C_8$-alkyl that may be substituted by $C_1$–$C_4$-alkoxy, or $C_6$–$C_{10}$-aryl-$C_1$–$C_8$-alkyl or $C_2C_8$-alkenyl; or $R_{20}$ and $R_{21}$ together are —$(CH_2)_{f1}$—$Z_3$—$(CH_2)_{f2}$— wherein $Z_3$ is a direct bond, —O—, —S— or —$NR_{26}$—, and $R_{26}$ is H or $C_1$–$C_8$-alkyl and f1 and f2 are each independently of the other an integer from 2 to 4; $R_{23}$ and $R_{24}$ are each independently of the other H, $C_1$–$C_8$-alkyl, $C_3$–$C_8$-cycloalkyl, benzyl or phenyl; and a, a1, b1, b2 and b3 are each independently of the other 0 or 1; subject to the provisos that b1 and b2 are each 0 when $R_{15}$ is H; that the total of (b1+b2+b3) is not exceeding 2; and that a is 0 when $R_{12}$ is a direct bond.

A preferred sub-group of compounds of formula (10a) or (10b) comprises those wherein, b1 and b2 are each 0; Z and $Z_1$ are each bivalent —O—; b3 is 0 or 1; $R_{14}$ is $C_1$–$C_4$-alkyl or phenyl, or both groups $R_{14}$ together are tetramethylene or pentamethylene; $R_{15}$ is $C_1$–$C_4$-alkyl or H, $R_{13}$ is hydrogen; a and a1 are each independently 0 or 1; $R_{12}$ is linear or branched $C_2$–$C_4$-alkylene, or is a direct bond, in which case a is 0; $R_{11}'$ is branched $C_5$–$C_{10}$-alkylene, phenylene or phenylene substituted by from 1 to 3 methyl groups, benzylene or benzylene substituted by from 1 to 3 methyl groups, cyclohexylene or cyclohexylene substituted by from 1 to 3 methyl groups, cyclohexyl-$C_yH_{2y}$— or —$C_yH_{2y}$-cyclohexyl-$C_yH_{2y}$— or cyclohexyl-$C_yH_{2y}$— or —$C_yH_{2y}$-cyclohexyl-$C_yH_{2y}$— substituted by from 1 to 3 methyl groups; y is 1 or 2; and $R_{16}$ has the same definitions as $R_{11}'$ or is linear $C_3$–$C_{10}$-alkylene.

An especially preferred sub-group of compounds of formula (10a) or (10b) comprises those wherein, b1 and b2 are each 0, Z and $Z_1$ are each bivalent —O—, b3 is 0 or 1; $R_{14}$ is methyl or phenyl, or both groups $R_{14}$ together are pentamethylene; $R_{15}$ is methyl or H; $R_{13}$ is hydrogen; a is 1 and $R_{12}$ is ethylene, or a is 0 and $R_{12}$ is a direct bond; a1 is 0 or 1; $R_{11}'$ is branched $C_6$–$C_{10}$-alkylene, phenylene or phenylene substituted by from 1 to 3 methyl groups, benzylene or benzylene substituted by from 1 to 3 methyl groups, cyclohexylene or cyclohexylene substituted by from 1 to 3 methyl groups, cyclohexyl-$CH_2$— or cyclohexyl-$CH_2$— substituted by from 1 to 3 methyl groups; $R_{16}$ has the same definitions as $R_{11}'$ or is linear $C_5$–$C_{10}$alkylene.

A preferred sub-group of compounds of formula (10c) comprises those wherein T is bivalent —O—, —NH—, —S— or —$(CH_2)_y$— wherein y is an integer from 1 to 6; $Z_2$ is a direct bond or —O—$(CH_2)_y$— wherein y is an integer from 1 to 6 and the terminal $CH_2$ group of which is linked to the adjacent T in formula (10c); $R_{17}$ is H, $C_1$–$C_{12}$-alkyl or $C_1$–$C_{12}$-alkoxy; $R_{18}$ is linear $C_1$–$C_8$-alkyl, $C_2$–$C_8$-alkenyl or $C_6$–$C_{10}$-aryl-$C_1$–$C_8$-alkyl; $R_{19}$ independently of $R_{18}$ has the same definitions as $R_{18}$ or is $C_6$–$C_{10}$-aryl, or $R_{18}$ and $R_{19}$ together are —$(CH_2)_e$— wherein e is an integer from 2 to 6; $R_{20}$ and $R_{21}$ are each independently of the other linear or branched $C_1$–$C_8$-alkyl that may be substituted by $C_1$–$C_4$-alkoxy, or $C_6$–$C_{10}$-aryl-$C_1$–$C_8$-alkyl or $C_2$–$C_8$-alkenyl; or $R_{20}$ and $R_{21}$ together are —$(CH_2)_{f1}$—$Z_3$—$(CH_2)_{f2}$— wherein $Z_3$ is a direct bond, —O—, —S— or —$NR_{26}$—, and $R_{26}$ is H or $C_1$–$C_8$-alkyl and f1 and f2 are each independently of the other an integer from 2 to 4; and $R_{16}$ is branched $C_6$–$C_{10}$-alkylene, phenylene or phenylene substituted by from 1 to 3 methyl groups, benzylene or benzylene substituted by from 1 to 3 methyl groups, cyclohexylene or cyclohexylene substituted by from 1 to 3 methyl groups, cyclohexylene-$CH_2$— or cyclohexylene-$CH_2$— substituted by from 1 to 3 methyl groups.

An especially preferred sub-group of compounds of formula (10c) comprises those wherein T is bivalent —O—; $Z_2$ is —O—$(CH_2)_y$— wherein y is an integer from 1 to 4 and the terminal $CH_2$ group of which is linked to the adjacent T in formula (10c); $R_{17}$ is H; $R_{18}$ is methyl, allyl, tolylmethyl or benzyl, $R_{19}$ is methyl, ethyl, benzyl or phenyl, or $R_{18}$ and $R_{19}$ together are pentamethylene, $R_{20}$ and $R_{21}$ are each independently of the other $C_1$–$C_4$-alkyl or $R_{20}$ and $R_{21}$ together are —$CH_2CH_2OCH_2CH_2$—, and $R_{16}$ is branched $C_6$–$C_{10}$-alkylene, phenylene or phenylene substituted by from 1 to 3 methyl groups, benzylene or benzylene substituted by from 1 to 3 methyl groups, cyclohexylene or cyclohexylene substituted by from 1 to 3 methyl groups, cyclohexylene-$CH_2$— or cyclohexylene-$CH_2$— substituted by from 1 to 3 methyl groups.

Some examples of especially preferred functional photoinitiators are the compounds of formulae

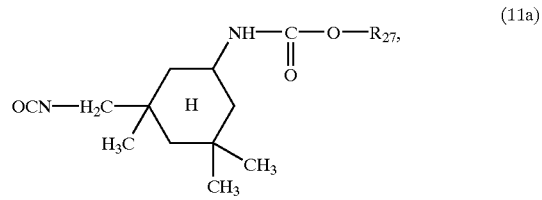

(11a)

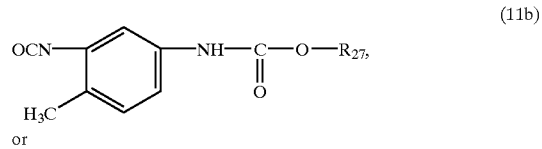

(11b)

or

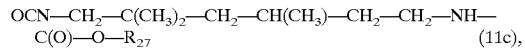

(11c), wherein $R_{27}$ is a radical

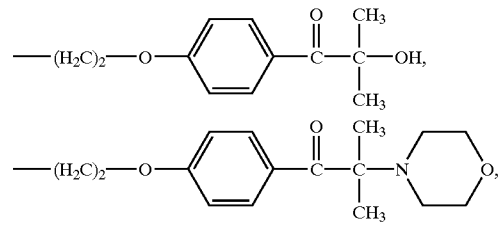

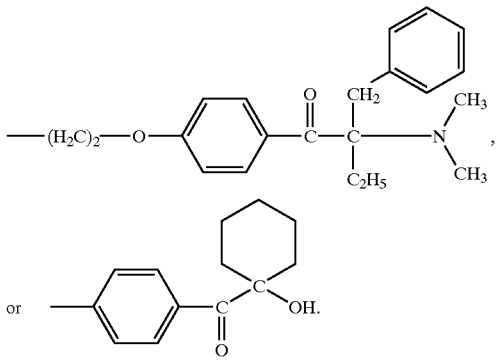

In a preferred embodiment of the invention, the covalent bonding between the inorganic or preferably organic substrate and the photoinitiator occurs via reaction of a hydroxy, amino, alkylamino, thiol or carboxy group, particularly of a hydroxy or amino group, of the substrate surface with an isocyanato group of the photoinitiator, for example using a photoinitiator of the above formula (10b), (10c), (11a), (11b) or (11c). Suitable methods for this are known, for example, from the above-mentioned documents. The reaction may be carried out, for example, at elevated temperature, for example from 0° to 100° C. and preferably at room temperature, and optionally in the presence of a catalyst. After the reaction, excess compounds can be removed, for example, with solvents.

According to a preferred embodiment of the invention the bulk material (a) of the composite material is an organic polymer containing H-active I groups, in particular —OH, —NH$_2$ and/or —NH—, on the surface that are coreactive with isocyanato groups, some or all of whose H atoms have been substituted by radicals of the formulae $R_{11}'$ has the above-given meanings, and then reacting the modified bulk material with a photoinitiator of the above-mentioned formula (10a). The following preferences apply to the variables contained in the definition of the macromonomer of formula (1):

R' is preferably hydrogen or $C_1$–$C_4$-alkyl, more preferably hydrogen or $C_1$–$C_2$-alkyl and particularly preferably hydrogen.

$R_1$ is preferably hydrogen, methyl or carboxyl, and particularly preferably hydrogen.

R is preferably hydrogen or methyl.

X is preferably a bivalent group —O— or —NH—. X is particularly preferably the group —NH— if (oligomer) is a radical of formula (3a); (3c) or (3d), and is particularly preferably the group —O— if (oligomer) is a radical of formula (3b). X' is preferably —O— or —NH— and more preferably —NH—. $X_1$ is preferably —O— or —NH—.

$R_{11}$ as alkylene is preferably a linear or branched $C_3$–$C_{14}$alkylene radical, more preferably a linear or branched $C_4$–$C_{12}$alkylene radical and most preferably a linear or branched $C_6$–$C_{10}$-alkylene radical. Some preferred alkylene radicals are 1,4-butylene, 2,2-dimethyl-1,4-butylene, 1,5-pentylene, 2,2-dimethyl-1,5-pentylene, 1,6-hexylene, 2,2,3- or 2,2,4-trimethyl-1,5-pentylene, 2,2-dimethyl-1,6-hexylene, 2,2,3- or 2,2,4- or 2,2,5-trimethyl-1,6-hexylene, 2,2-dimethyl-1,7-heptylene, 2,2,3- or 2,2,4- or 2,2,5- or 2,2,6-trimethyl-1,7-heptylene, 1,8-octylene, 2,2-dimethyl-1,8-octylene and 2,2,3- or 2,2,4- or 2,2,5- or 2,2,6- or 2,2,7-trimethyl-1,8-octylene.

When $R_{11}$ is arylene, it is, for example, naphthylene or especially phenylene, each of which may be substituted, for example, by $C_1$–$C_4$-alkyl or by $C_1$–$C_4$-alkoxy. Preferably, $R_{11}$ as arylene is 1,3- or 1,4-phenylene that is unsubstituted or substituted by $C_1$–$C_4$-alkyl or by $C_1$–$C_4$-alkoxy in the

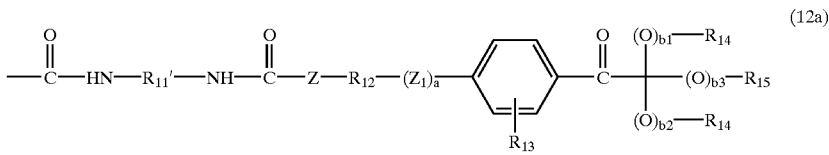

(12a)

or

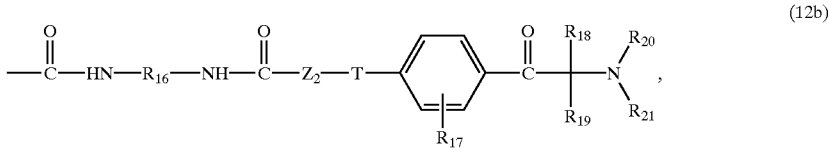

(12b)

wherein for the variables $R_{11}'$—$R_{21}$, T, Z, $Z_1$, $Z_2$, a, b1, b2 and b3 the above-given meanings and preferences apply.

In another preferred embodiment of the invention, the covalent bonding between the inorganic or preferably organic substrate and the photoinitiator occurs via reaction of a epoxy, carboxanhydride, lactone, azlactone or preferably isocyanato group of the substrate surface with a hydroxy, amino, alkylamino, thiol or carboxy group, particularly with a carboxy, hydroxy or amino group, of the photoinitiator, for example using a photoinitiator of the above formula (10a). This may be carried out, for example, by first reacting an above-mentioned bulk material containing H-active groups on the surface, in particular —OH, —NH$_2$ and/or —NH, selectively with one isocyanato group of a diisocyanate of formula OCN—$R_{11}'$—NCO, wherein ortho-position to at least one linkage site. Examples of substituted arylene are 1-methyl-2,4-phenylene, 1,5-dimethyl-2,4-phenylene, 1-methoxy-2,4-phenylene and 1-methyl-2,7-naphthylene.

$R_{11}$ as aralkylene is preferably naphthylalkylene and most preferably phenylalkylene. The alkylene group in aralkylene contains preferably from 1 to 12, more preferably from 1 to 6 and most preferably from 1 to 4 carbon atoms. Most preferably, the alkylene group in aralkylene is methylene or ethylene. Some examples are 1,3- or 1,4-benzylene, naphth-2-yl-7-methylene, 6-methyl-1,3- or -1,4-benzylene and 6-methoxy-1,3- or -1,4-benzylene.

When $R_{11}$ is cycloalkylene, it is preferably $C_5$–$C_6$cycloalkylene and most preferably cyclohexylene that is unsubstituted or substituted by methyl. Some examples are 1,3-cyclobutylene, 1,3-cyclopentylene, 1,3- or 1,4-cyclohexylene, 1,3- or 1,4-cycloheptylene, 1,3- or 1,4- or 1,5-cyclooctylene, 4-methyl-1,3-cyclopentylene, 4-methyl-1,3-cyclohexylene, 4,4 -dimethyl-1,3-cyclohexylene, 3-methyl- or 3,3-dimethyl-1,4-cyclohexylene, 3,5-dimethyl-1,3-cyclohexylene and 2,4-dimethyl-1,4-cyclohexylene.

When $R_{11}$ is cycloalkylene-alkylene, it is preferably cyclopentylene-$C_1$–$C_4$-alkylene and especially cyclohexylene-$C_1$–$C_4$-alkylene, each unsubstituted or mono- or poly-substituted by $C_1$–$C_4$-alkyl, especially methyl. More preferably, the group cycloalkylene-alkylene is cyclohexylene-ethylene and, most preferably, cyclohexylene-methylene, each unsubstituted or substituted in the cyclohexylene radical by from 1 to 3 methyl groups. Some examples are cyclopent-1-yl-3-methylene, 3-methyl-cyclopent-1-yl-3-methylene, 3,4-dimethyl-cyclopent-1-yl-3-methylene, 3,4,4-trimethyl-cyclopent-1-yl-3-methylene, cyclohex-1-yl-3- or -4-methylene, 3- or 4- or 5-methyl-cyclohex-1-yl-3- or -4-methylene, 3,4- or 3,5-dimethyl-cyclohex-1-yl-3- or -4-methylene and 3,4,5- or 3,4,4- or 3,5,5-trimethyl-cyclohex-1-yl-3- or -4-methylene.

When $R_{11}$ is alkylene-cycloalkylene-alkylene, it is preferably $C_1$–$C_4$-alkylene-cyclopentylene-$C_1$–$C_4$-alkylene and especially $C_1$–$C_4$-alkylene-cyclohexylene-$C_1$–$C_4$-alkylene, each unsubstituted or mono- or poly-substituted by $C_1$–$C_4$-alkyl, especially methyl. More preferably, the group alkylene-cycloalkylene-alkylene is ethylene-cyclohexylene-ethylene and, most preferably, is methylene-cyclohexylene-methylene, each unsubstituted or substituted in the cyclohexylene radical by from 1 to 3 methyl groups. Some examples are cyclopentane-1,3-dimethylene, 3-methyl-cyclopentane-1,3-dimethylene, 3,4-dimethyl-cyclopentane-1,3-di-methylene, 3,4,4-trimethyl-cyclopentane-1,3-dimethylene, cyclohexane-1,3- or -1,4-di-methylene, 3- or 4- or 5-methyl-cyclohexane-1,3- or -1,4-dimethylene, 3,4- or 3,5-dimethyl-cyclohexane-1,3- or -1,4-dimethylene, 3,4, 5- or 3,4,4- or 3,5,5-trimethyl-cyclohexane-1,3- or -1,4-dimethylene.

$R_{11}$ as $C_3$–$C_8$-cycloalkylene-$C_1$–$C_2$-alkylene-$C_3$–$C_8$-cycloalkylene or $C_6$–$C_{10}$-arylene-$C_1$–$C_2$-alkylene-$C_6$–$C_{10}$-arylene is preferably $C_5$–$C_6$-cycloalkylene-methylene-$C_5$–$C_6$-cycloalkylene or phenylene-methylene-phenylene, each of which may be unsubstituted or substituted in the cycloalkyl or phenyl ring by one or more methyl groups.

The radical $R_{11}$ has a symmetrical or, preferably, an asymmetrical structure. A preferred group of radicals $R_{11}$ comprises those, wherein $R_{11}$ is linear or branched $C_6$–$C_{10}$alkylene; cyclohexylene-methylene or cyclohexylene-methylene-cyclohexylene each unsubstituted or substituted in the cyclohexyl moiety by from 1 to 3 methyl groups; or phenylene or phenylene-methylene-phenylene each unsubstituted or substituted in the phenyl moiety by methyl. The bivalent radical $R_{11}$ is derived preferably from a diisocyanate and most preferably from a diisocyanate selected from the group isophorone diisocyanate (IPDI), toluylene-2,4-diisocyanate (TDI), 4,4'-methylenebis(cyclohexyl isocyanate), 1,6-diisocyanato-2,2, 4-trimethyl-n-hexane (TMDI), methylenebis(phenyl isocyanate), methylenebis(cyclohexyl-4-isocyanate) and hexamethylene diisocyanate (HMDI).

Preferred meanings of $A_1$ are unsubstituted or hydroxy-substituted —O—$C_2$–$C_8$-alkylene or a radical —O—$C_2$–$C_6$-alkylene-NH—C(O)— and particularly —O—$(CH_2)_{2-4}$—, —O—$CH_2$—CH(OH)—$CH_2$— or a radical —O—$(CH_2)_{2-4}$—NH-C(O)—. A particularly preferred meaning of $A_1$ is the radical —O—$(CH_2)_2$—NH—C(O)—.

$A_2$ is preferably $C_1$–$C_6$-alkylene, phenylene or benzylene, more preferably $C_1$–$C_4$-alkylene and even more preferably $C_1$–$C_2$-alkylene. n is an integer of 0 or preferably 1. m is preferably an integer of 1. $R_1'$ is preferably hydrogen or methyl and particularly preferably hydrogen. In case that (oligomer) is a radical of formula (3a), (3b), (3c) or (3d), A preferably denotes a radical of formula (2a) or (2b) and particularly preferably a radical of formula (2a), wherein the above given meanings and preferences apply for the variables contained therein. A preferred group of hydrophilic macromonomers according to the invention comprises compounds of the above formula (1), wherein R is hydrogen or methyl, $R_1$ is hydrogen, methyl or carboxyl, $R_1'$ is hydrogen, A is a radical of the formula (2a) or (2b) and (oligomer) is a radical of formula (3a), (3b), (3c) or (3d). . An even more preferred group of hydrophilic macromonomers comprises compounds of the above formula (1), wherein R is hydrogen or methyl, $R_1$ and $R_1'$ are each hydrogen, A is a radical of the formula (2a) and (oligomer) is a radical of formula (3a), (3b), (3c) or (3d). A further group of preferred macromonomers comprises compounds of formula (1), wherein A is a radical of formula (2e) above and (oligomer) is a radical of formula (3a).

(alk) and (alk*) are each independently preferably $C_2$–$C_8$-alkylene, more preferably $C_2$–$C_6$-alkylene, even more preferably $C_2$–$C_4$-alkylene and particularly preferably 1,2-ethylene. The alkylene radicals (alk) and (alk*) may be branched or preferably linear alkylene radicals.

Q is for example hydrogen.

The total of (p+q) is preferably an integer from 2 to 150, more preferably from 5 to 100, even more preferably from 5 to 75 and particularly preferably from 10 to 50. In a preferred embodiment of the invention q is 0 and p is an integer from 2 to 250, preferably from 2 to 150, more preferably from 5 to 100, even more preferably from 5 to 75 and particularly preferably from 10 to 50.

Suitable hydrophilic substituents of the radicals B or B' may be non-ionic, anionic, cationic or zwitterionic substituents. Accordingly, the telomer chain of formula (3a) that contains monomer units B and/or B' may be a charged chain containing anionic, cationic and/or zwitterionic groups or may be an uncharged chain. In addition, the telomer chain may comprise a copolymeric mixture of uncharged and charged units. The distribution of the charges within the telomer, if present, may be random or blockwise.

In one preferrred embodiment of the invention, the telomer radical of formula (3a) is composed solely of non-ionic monomer units B and/or B'. In another preferred embodiment of the invention, the telomer radical of formula (3a) is composed solely of ionic monomer units B and/or B', for example solely of cationic monomer units or solely of anionic monomer units. Still another preferred embodiment of the invention is directed to telomer radicals of formula (3a) comprising nonionic units B and ionic units B'.

Suitable non-ionic substituents of B or B' include for example a radical $C_1$–$C_6$-alkyl which is substituted by one or more same or different substituents selected from the group consisting of —OH, $C_1$–$C_4$-alkoxy and —$NR_9R_9'$, wherein $R_9$ and $R_9'$ are each independently of another hydrogen or unsubstituted or hydroxy-substituted $C_1$–$C_6$-alkyl or phenyl; phenyl which is substituted by hydroxy, $C_1$–$C_4$-alkoxy or —$NR_9R_9'$, wherein $R_9$ and $R_9'$ are as defined above; a radical —COOY, wherein Y is $C_1$–$C_{24}$-alkyl which is unsubstituted or substituted, for example, by hydroxy, $C_1$–$C_4$-alkoxy, —O—$Si(CH_3)_3$, —$NR_{9R_9}'$ wherein $R_9$ and $R_9'$ are as defined above, a radical —O—$(CH_2CH_2O)_{1-24}$—E wherein E is hydrogen or $C_1$–$C_6$-alkyl, or a radical —NH—C(O)—O—G, wherein —O—G is the radical of a saccharide with 1 to 8 sugar units or is a radical —O—(CH$_2$CH$_2$O)$_{1-24}$—E, wherein E is as defined above, or Y is C$_5$–C$_8$-cycloalkyl which is unsubstituted or substituted by C$_1$–C$_4$-alkyl or C$_1$–C$_4$-alkoxy, or is unsubstituted or C$_1$–C$_4$-alkyl- or C$_1$–C$_4$-alkoxy-substituted phenyl or C$_7$–C$_{12}$-aralkyl; —CONY$_1$Y$_2$ wherein Y$_1$ and Y$_2$ are each independently hydrogen, C$_1$–C$_{12}$-alkyl, which is unsubstituted or substituted for example by hydroxy, C$_1$–C$_4$-alkoxy or a radical —O—(CH$_2$CH$_2$O)$_{1-24}$—E wherein E is as defined above, or Y$_1$ and Y$_2$ together with the adjacent N-atom form a five- or six-membered heterocyclic ring having no additional heteroatom or one additional oxygen or nitrogen atom; a radical —OY$_3$, wherein Y$_3$ is hydrogen; or C$_1$–C$_{12}$-alkyl which is unsubstituted or substituted by —NR$_9$R$_9$'; or is a radical —C(O)—C$_1$–C$_4$-alkyl; and wherein R$_9$ and R$_9$' are as defined above; or a five- to seven-membered heterocyclic radical having at least one N-atom and being bound in each case via said nitrogen atom.

Suitable anionic substituents of B or B' include for example C$_1$–C$_6$-alkyl which is substituted by —SO$_3$H, —OSO$_3$H, —OPO$_3$H$_2$ and —COOH; phenyl which is substituted by one or more same or different substituents selected from the group consisting of —SO$_3$H, —COOH, —OH and —CH$_2$—SO$_3$H; —COOH; a radical —COOY$_4$, wherein Y$_4$ is C$_1$–C$_{24}$-alkyl which is substituted for example by —COOH, —SO$_3$H, —OSO$_3$H, —OPO$_3$H$_2$ or by a radical —NH—C(O)—O—G' wherein G' is the radical of an anionic carbohydrate; a radical —CONY$_5$Y$_6$ wherein Y$_5$ is C$_1$–C$_{24}$-alkyl which is substituted by —COOH, —SO$_3$H, —OSO$_3$H, or —OPO$_3$H$_2$ and Y$_6$ independently has the meaning of Y$_5$ or is hydrogen or C$_1$–C$_{12}$-alkyl; or —SO$_3$H; or a salt thereof, for example a sodium, potassium, ammonium or the like salt thereof.

Suitable cationic substituents of B or B' include C$_1$–C$_{12}$-alkyl which is substituted by a radical —NR$_9$R$_9$'R$_9$''$^+$An$^-$, wherein R$_9$R$_9$' and R$_{99}$'' are each independently of another hydrogen or unsubstituted or hydroxy-substituted C$_1$–C$_6$-alkyl or phenyl, and An$^-$ is an anion; or a radical —C(O)OY$_7$, wherein Y$_7$ is C$_1$–C$_{24}$-alkyl which is substituted by —NR$_9$R$_9$'R$_9$''$^+$An$^-$ and is further unsubstituted or substituted for example by hydroxy, wherein R$_9$, R$_9$', R$_9$'' and An$^-$ are as defined above.

Suitable zwitterionic substituents of B or B' include a radical —R$_3$—Zw, wherein R$_3$ is a direct bond or a functional group, for example a carbonyl, carbonate, amide, ester, dicarboanhydride, dicarboimide, urea or urethane group; and Zw is an aliphatic moiety comprising one anionic and one cationic group each.

The following preferences apply to the hydrophilic substituents of B and B':

(i) Non-ionic Substituents

Preferred alkyl substituents of B or B' are C$_1$–C$_4$-alkyl, in particular C$_1$–C$_2$-alkyl, which is substituted by one or more substituents selected from the group consisting of —OH and —NR$_9$R$_9$', wherein R$_9$ and R$_9$' are each independently of another hydrogen or C$_1$–C$_4$-alkyl, preferably hydrogen, methyl or ethyl and particularly preferably hydrogen or methyl, for example —CH$_2$—NH$_2$, —CH$_2$—N(CH$_3$)$_2$. Preferred phenyl substituents of B or B' are phenyl which is substituted by —NH$_2$ or N(C$_1$–C$_2$-alkyl)$_2$, for example o-, m- or p-aminophenyl. In case that the hydrophilic substituent of B or B' is a radical —COOY, Y as optionally substituted alkyl is preferably C$_1$–C$_{12}$-alkyl, more preferably C$_1$–C$_6$-alkyl, even more preferably C$_1$–C$_4$-alkyl and particularly preferably C$_1$–C$_2$-alkyl, each of which being unsubstituted or substituted as mentioned above. In case that the alkyl radical Y is substituted by —NR$_9$R$_9$', the above-given meanings and preferences apply for R$_9$ and R$_9$'. Examples of suitable saccharide substituents —O—G of the alkyl radical Y that is substituted by —NH—C(O)—O—G are the radical of a mono- or disaccharide, for example glucose, acetyl glucose, methyl glucose, glucosamine, N-acetyl glucosamine, glucono lactone, mannose, galactose, galactosamine, N-acetyl galactosamine, fructose, maltose, lactose, fucose, saccharose or trehalose, the radical of an anhydrosaccharide such as levoglucosan, the radical of a glucosid such as octylglucosid, the radical of a sugar alcohol such as sorbitol, the radical of a sugar acid derivative such as lactobionic acid amide, or the radical of an oligosaccharide with a maximum of 8 sugar units, for example fragments of a cyclodextrin, starch, chitosan, maltotriose or maltohexaose. The radical —O—G preferably denotes the radical of a mono- or disaccharide or the radical of a cyclodextrin fragment with a maximum of 8 sugar units. Particular preferred saccharide radicals —O—G are the radical of trehalose or the radical of a cyclodextrin fragment. In case that the alkyl radical Y is substituted by a radical —O—(CH$_2$CH$_2$O)$_{1-24}$—E or —NH—C(O)—O—G wherein —O—G is —O—(CH$_2$CH$_2$O)$_{1-24}$—E, the number of (CH$_2$CH$_2$O) units is preferably from 1 to 12 in each case and more preferably from 2 to 8. E is preferably hydrogen or C$_1$–C$_2$-alkyl. Y as C$_5$–C$_8$-cycloalkyl is for example cyclopentyl or preferably cyclohexyl, each of which being unsubstituted or substituted for example by 1 to 3 C$_1$–C$_2$-alkyl groups. Y as C$_7$–C$_{12}$-aralkyl is for example benzyl.

Preferred nonionic radicals —COOY are those wherein Y is C$_1$–C$_6$-alkyl; or C$_2$–C$_6$-alkyl which is substituted by one or two substituents selected from the group consisting of hydroxy; ; C$_1$–C$_2$-alkoxy; —O—Si(CH$_3$)$_3$; and —NR$_9$R$_9$' wherein R$_9$ and R$_9$' are each independently of another hydrogen or C$_1$–C$_4$-alkyl; or Y is a radical —CH$_2$CH$_2$—O—(CH$_2$CH$_2$O)$_{1-12}$—E wherein E is hydrogen or C$_1$–C$_2$-alkyl; or is a radical —C$_2$–C$_4$-alkylene-NH—C(O)—O—G, wherein —O—G is the radical of a saccharide.

More preferred non-ionic radicals —COOY are those wherein Y is C$_1$–C$_4$-alkyl; or C$_2$–C$_4$-alkyl which is substituted by one or two substituents selected from the group consisting of —OH and —NR$_9$R$_9$' wherein R$_9$ and R$_9$' are each independently of another hydrogen or C$_1$–C$_2$-alkyl; or a radical —CH$_2$CH$_2$—O—(CH$_2$CH$_2$O)$_{1-12}$—E wherein E is hydrogen or C$_1$–C$_2$-alkyl; or is a radical —C$_2$–C$_4$-alkylene-NH—C(O)—O—G wherein —O—G is the radical of a saccharide.

Particularly preferred radicals —COOY comprise those wherein Y is C$_1$–C$_2$-alkyl, particularly methyl; or C$_2$–C$_3$-alkyl, which is unsubstituted or substituted by hydroxy or N,N-di–C$_1$–C$_2$-alkylamino, or is a radical —C$_2$–C$_3$-alkylene-NH—C(O)—O—G wherein —O—G is the radical of trehalose or the radical of a cyclodextrin fragment with a maximum of 8 sugar units.

Preferred non-ionic substituents —C(O)—NY$_1$Y$_2$ of B or B' are those wherein Y$_1$ and Y$_2$ are each independently of the other hydrogen or C$_1$–C$_6$-alkyl which is unsubstituted or substituted by hydroxy; or Y$_1$ and Y$_2$ together with the adjacent N-atom form a heterocyclic 6-membered ring having no further heteroatom or having one further N- or O-atom. Even more preferred meanings of Y$_1$ and Y$_2$, independently of each other, are hydrogen or C$_1$–C$_4$-alkyl which is unsubstituted or substituted by hydroxy; or Y$_1$ and Y$_2$ together with the adjacent N-atom form a N—C$_1$–C$_2$-alkylpiperazino or morpholino ring. Particularly preferred non-ionic radicals —C(O)—NY$_1$Y$_2$ are those wherein Y$_1$ and Y$_2$ are each independently of the other hydrogen or $C_1$–$C_2$-alkyl; or $Y_1$ and $Y_2$ together with the adjacent N-atom form a morpholino ring.

Preferred non-ionic substituents —$OY_3$ of B or B' are those wherein $Y_3$ is hydrogen, $C_1$–$C_4$-alkyl which is unsubstituted or substituted by —$NH_2$ or —$N(C_1$–$C_2$-alkyl$)_2$, or is a group —$C(O)C_1$–$C_2$-alkyl. $Y_3$ is particularly preferred hydrogen or acetyl.

Preferred non-ionic heterocyclic substituents of B or B' are a 5- or 6-membered heteroaromatic or heteroaliphatic radical having one N-atom and in addition no further heteroatom or an additional N- or O-heteroatom, or is a 5 to 7-membered lactame. Examples of such heterocyclic radicals are N-pyrrolidonyl, 2- or 4-pyridinyl, 2-methyl pyridin-5-yl, 2-, 3- oder 4-hydroxypyridinyl, N-ϵ-caprolactamyl, N-imidazolyl, 2-methylimidazol-1-yl, N-morpholinyl or 4-N-methylpiperazin-1-yl, particularly N-morpholinyl or N-pyrrolidonyl.

A group of preferred non-ionic substituents of B or B' comprises $C_1$–$C_2$-alkyl, which is unsubstituted or substituted by —OH or —$NR_9R_9'$, wherein $R_9$ and $R_9'$ are each independently of the other hydrogen or $C_1$–$C_2$-alkyl; a radical —COOY wherein Y is $C_1$–$C_4$-alkyl; $C_2$–$C_4$-alkyl which is substituted by —OH, —$NR_9R_9'$ wherein $R_9$ and $R_9'$ are each independently of another hydrogen or $C_1$–$C_2$-alkyl, or Y is a radical —$C_2$–$C_4$-alkylene-NH—C(O)—O—G wherein —O—G is the radical of a saccharide; a radical —C(O)—$NY_1Y_2$, wherein $Y_1$ and $Y_2$ are each independently of the other hydrogen or $C_1$–$C_6$-alkyl which is unsubstituted or substituted by hydroxy, or $Y_1$ and $Y_2$ together with the adjacent N-atom form a heterocyclic 6-membered ring having no further heteroatom or having one further N- or O-atom; a radical —$OY_3$, wherein $Y_3$ is hydrogen, $C_1$–$C_4$-alkyl which is unsubstituted or substituted by —$NH_2$ or —$N(C_1$–$C_2$-alkyl$)_2$, or is a group —C(O) $C_1$–$C_2$-alkyl; or a 5- or 6-membered heteroaromatic or heteroaliphatic radical having one N-atom and in addition no further heteroatom or an additional N-, O- or S-heteroatom, or a 5 to 7-membered lactame.

A group of more preferred non-ionic substituents of B or B' comprises a radical —COOY, wherein Y is $C_1$–$C_2$-alkyl, $C_2$–$C_3$-alkyl, which is substituted by hydroxy, amino or N,N-di-$C_1$–$C_2$-alkylamino, or is a radical —$C_2$–$C_4$-alkylene-NH—C(O)—O—G wherein —O—G is the radical of trehalose or a cyclodextrin fragment with a maximum of 8 sugar units; a radical —CO—$NY_1Y_2$, wherein $Y_1$ and $Y_2$ are each independently of the other hydrogen or $C_1$–$C_4$-alkyl which is unsubstituted or substituted by hydroxy, or $Y_1$ and $Y_2$ together with the adjacent N-atom form a N—$C_1$–$C_2$-alkylpiperazino or morpholino ring; or a heterocyclic radical selected from the group consisting of N-pyrrolidonyl, 2- or 4-pyridinyl, 2-methylpyridin-5-yl, 2-, 3- oder 4-hydroxypyridinyl, N-ϵ-caprolactamyl, N-imidazolyl, 2-methylimidazol-1-yl, N-morpholinyl and 4-N-methylpiperazin-1-yl.

A particularly preferred group of non-ionic substituents of B or B' comprises the radicals —COO—$C_1$—$C_2$-alkyl, —COO—$(CH_2)_{2-4}$—OH, —$CONH_2$, —$CON(CH_3)_2$, —CONH—$(CH_2)_2$—OH,

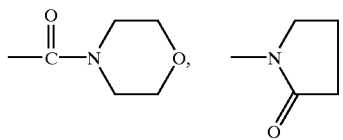

and —COO$(CH_2)_{2-4}$—NHC(O)—O—G wherein —O—G is the radical of trehalose or a cyclodextrin fragment with a maximum of 8 sugar units.

(ii) Anionic Substituents

Preferred anionic substituents of B or B' are $C_1$–$C_4$-alkyl, in particular $C_1$–$C_2$-alkyl, which is substituted by one or more substituents selected from the group consisting of —$SO_3H$ and —$OPO_3H_2$, for example —$CH_2$—$SO_3H$; phenyl which is substituted by —$SO_3H$ or sulfomethyl, for example o-, m- or p-sulfophenyl or o-, m- or p-sulfomethylphenyl; —COOH; a radical —$COOY_4$, wherein $Y_4$ is $C_2$–$C_6$-alkyl which is substituted by —COOH, —$SO_3H$, —$OSO_3H$, —$OPO_3H_2$, or by a radical —NH—C(O)—O—G' wherein G' is the radical of lactobionic acid, hyaluronic acid or sialic acid, in particular $C_2$–$C_4$-alkyl which is substituted by —$SO_3H$ or —$OSO_3H$; a radical —$CONY_5Y_6$ wherein $Y_5$ is $C_1$–$C_6$-alkyl substituted by sulfo, in particular $C_2$–$C_4$-alkyl substituted by sulfo, and $Y_6$ is hydrogen, for example the radical —C(O)—NH—$C(CH_3)_2$—$CH_2$—$SO_3H$; or —$SO_3H$; or a suitable salt thereof. Particular preferred anionic substituents of B or B' are —COOH, —$SO_3H$, o-, m- or p-sulfophenyl, o-, m- or p-sulfomethylphenyl or a radical —$CONY_5Y_6$ wherein $Y_5$ is $C_2$–$C_4$-alkyl substituted by sulfo, and $Y_6$ is hydrogen.

(iii) Cationic Substituents

Preferred cationic substituents of B or B' are $C_1$–$C_4$-alkyl, in particular $C_1$–$C_2$-alkyl, which is in each case substituted by —$NR_9R_9'R_9''^+An^-$; or a radical —$C(O)OY_7$ wherein $Y_7$ is $C_2$–$C_6$-alkyl, in particular $C_2$–$C_4$-alkyl, which is in each case substituted by —$NR_9R_9'R_9''^+An^-$ and is further unsubstituted or substituted by hydroxy. $R_9$, $R_9'$ and $R_9''$ are each independently of another preferably hydrogen or $C_1$–$C_4$-alkyl, more preferably methyl or ethyl and particularly preferably methyl. Examples of suitable anions $An^-$ are $Hal^-$, wherein Hal is halogen, for example $Br^-$, $F^-$, $J^-$ or particularly $Cl^-$, furthermore $HCO_3^-$, $CO_3^-$, $H_2PO_3^-$, $HPO_3^{2-}$, $PO_3^{3-}$, $HSO_4^-$, $SO_4^{2-}$ or the radical of an organic acid such as $OCOCH_3^-$ and the like. A particularly preferred cationic substituent of B or B' is a radical —$C(O)OY_7$ wherein $Y_7$ is $C_2$–$C_4$-alkyl, which is substituted by —$N(C_1$–$C_2$-alkyl$)_3^+An^-$ and is further substituted by hydroxy, and $An^-$ is an anion, for example the radical —C(O)O—$CH_2$—CH(OH)—$CH_2$—$N(CH_3)_3^+An^-$.

(iv) Zwitterionic Substituents —$R_3$—Zw $R_3$ is a preferably a carbonyl, ester or amide functional group and more preferably an ester group —C(O)—O—. Suitable anionic groups of the moiety Zw are for example —$COO^-$, —$SO_3^-$, —$OSO_3^-$, —$OPO_3H^-$ or bivalent —O—$PO_2^-$ or —O—$PO_2^-$—O—, preferably a group —$COO^-$ or —$SO_3^-$ or a bivalent group —O—$PO_2^-$—, and in particular a group —$SO_3^-$. Suitable cationic groups of the moiety Zw are for example a group —$NR_9R_9'R_9''^+$ or a bivalent group —$NR_9R_9'^+$—, wherein $R_9$, $R_9'$ and $R_9''$ are as defined above, and are each independently of the other, preferably hydrogen or $C_1$–$C_6$-alkyl, preferably hydrogen or $C_1$–$C_4$-alkyl and most preferably each methyl or ethyl.

The moiety Zw is for example $C_2$–$C_{30}$-alkyl, preferably $C_2$–$C_{12}$-alkyl, and more preferably $C_3$–$C_8$-alkyl, which is in each case uninterrupted or interrupted by —O— and substituted or interrupted by one of the above-mentioned anionic and cationic groups each, and, in addition, is further unsubstituted or substituted by a radical —$OY_8$, wherein $Y_8$ is hydrogen or the acyl radical of a carboxylic acid.

$Y_8$ is preferably hydrogen or the acyl radical of a higher fatty acid.

Zw is preferably $C_2$–$C_{12}$-alkyl and even more preferably $C_3$–$C_8$-alkyl which is substituted or interrupted by one of the above-mentioned anionic and cationic groups each, and in addition may be further substituted by a radical —$OY_8$.

A preferred group of zwitter-ionic substituents —$R_3$—Z corresponds to the formula

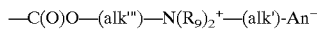

or

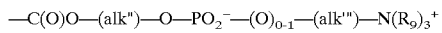

wherein $R_9$ is hydrogen or $C_1$–$C_6$-alkyl; $An^-$ is an anionic group —$COO^-$, —$SO_3^-$, —$OSO_3^+$ or —$OPO_3H^-$, preferably —$COO^-$ or —$SO_3^-$ and most preferably —$SO_3^-$, alk' is $C_1$–$C_{12}$-alkylene, (alk") is $C_2$–$C_{24}$-alkylene which is unsubstituted or substituted by a radical —$OY_8$, $Y_8$ is hydrogen or the acyl radical of a carboxylic acid, and (alk''') is $C_2$–$C_8$-alkylene.

(alk') is preferably $C_2$–$C_8$-alkylene, more preferably $C_2$–$C_6$-alkylene and most preferably $C_2$–$C_4$-alkylene. (alk") is preferably $C_2$–$C_{12}$-alkylene, more preferably $C_2$–$C_6$-alkylene and particularly preferably $C_2$–$C_3$-alkylene which is in each case unsubstituted or substituted by hydroxy or by a radical —$OY_8$. (alk''') is preferably $C_2$–$C_4$-alkylene and more preferably $C_2$–$C_3$-alkyl or hydroxy-$C_1$–$C_2$-alkyl. Particularly preferred —$CHR_7$—$CHR_8$— units according to the invention are those wherein $R_7$ is methyl or a group —$C(O)OY_9$ and $R_8$ is a group —$C(O)OY_9'$ or —$CH_2$—$C(O)OY_9'$ wherein $Y_9$ and $Y_9'$ are each hydrogen, $C_1$–$C_2$-alkyl or hydroxy-$C_1$–$C_2$-alkyl.

B' independently may have one of the meanings given above for B or is the radical of a hydrophobic comonomer, for example the radical of one of the above-given hydrophobic comonomers.

If (oligomer) is a telomer radical of formula (3a), the radical -(alk)-S—[B]$_p$—[B']$_q$—Q preferably denotes a radical of formula

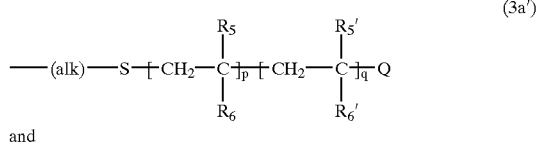

and even more preferably of the formula

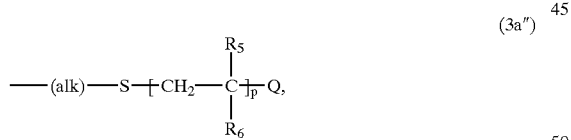

wherein for $R_5$, $R_6$, Q, p and q the above-given meanings and preferences apply, for $R_5'$ independently the meanings and preferences given before for $R_5$ apply, and for $R_6'$ independently the meanings and preferences given before for $R_6$ apply or $R_6'$ is a hydrophobic substituent selected from the group consisting of hydrogen, —CN, $C_1$–$C_8$-alkanoyl, $C_1$–$C_{16}$-alkyl, $C_1$–$C_{16}$-haloalkyl, phenyl, $C_1$–$C_6$-alkylphenyl, $C_2$–$C_{10}$-perfluoroalkyl-oxycarbonyl or a corresponding partially fluorinated alkyloxycarbonyl radical, $C_3$–$C_{12}$-perfluoroalkyl-ethyl-thiocarbonylaminoethyloxycarbonyl, alkylsiloxyloxycarbonyl and carbazolyl.

A preferred group of suitable hydrophilic macromers according to the invention comprises compounds of the above formula (1) wherein R is hydrogen or methyl, $R_1$ is hydrogen, methyl or carboxyl, $R_1'$ is hydrogen, A is a radical of the above formula (2a), (2b) or (2e), wherein n and m are each 0 or 1, X and $X_1$ are each independently of the other —O— or —NH—, $A_1$ is unsubstituted or hydroxy-substituted —O—$C_2$—$C_8$-alkylene or a radical —O—$C_2$–$C_6$-alkylene-NH—C(O)—, $A_2$ is $C_1$–$C_4$-alkylene, phenylene or benzylene, (alk*) is $C_2$–$C_4$-alkylene, and (oligomer) denotes a radical of formula alkylene. $R_9$ is hydrogen or $C_1$–$C_4$-alkyl, more preferably methyl or ethyl and particularly preferably methyl. A preferred zwitterionic substituent of B or B' is of formula

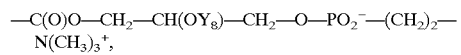

wherein $Y_8$ is hydrogen or the acyl radical of a higher fatty acid.

In one embodiment of the invention one of B and B' may also be the radical of a hydrophobic comonomer which includes especially those customarily used in the manufacture of contact lenses. Suitable hydrophobic vinylic comonomers include, without the list being exhaustive acrylonitrile, methacrylonitrile, vinyl-$C_1$–$C_{18}$-alkanoates, $C_2$–$C_{18}$-alkenes, $C_2$–$C_{18}$-haloalkenes, styrene, $C_1$–$C_6$-alkylstyrene, $C_2$–$C_{10}$-perfluoroalkyl acrylates and methacrylates or correspondingly partially fluorinated acrylates and methacrylates, $C_3$–$C_{12}$-perfluoroalkyl-ethyl-thiocarbonylaminoethyl acrylates and methacrylates, acryloxy- and methacryloxy-alkylsiloxanes, N-vinylcarbazole and the like. Examples of suitable hydrophobic vinylic comonomers include acrylonitrile, methacrylonitrile, vinyl acetate, vinyl propionate, vinylbutyrate, vinyl valerate, styrene, chloroprene, vinyl chloride, vinylidene chloride, 1-butene, butadiene, vinyltoluene, perfluorohexylethylthiocarbonylaminoethyl methacrylate, trifluoroethyl methacrylate, hexafluoroisopropyl methacrylate, hexafluorobutyl methacrylate, tris-trimethylsilyloxy-silyl-propyl methacrylate, 3-methacryloxypropylpentamethyidisiloxane and bis (methacryloxypropyl)tetramethyldisiloxane.

B denotes for example a radical of formula

or

wherein $R_5$ is hydrogen or $C_1$–$C_4$-alkyl, preferably hydrogen or methyl; $R_6$ is a hydrophilic substituent, wherein the above given meanings and preferences apply; $R_7$ is $C_1$–$C_4$-alkyl, phenyl or a radical —$C(O)OY_9$, wherein $Y_9$ is hydrogen or unsubstituted or hydroxy-substituted $C_1$–$C_4$-alkyl; and $R_8$ is a radical —$C(O)Y_9'$ or —$CH_2$—$C(O)OY_9'$ wherein $Y_9'$ independently has the meaning of $Y_9$.

$R_7$ is preferably $C_1$–$C_2$-alkyl, phenyl or a group —$C(O)OY_9$. $R_8$ is preferably a group —$C(O)OY_9'$ or —$CH_2$—$C(O)OY_9'$ wherein $Y_9$ and $Y_9'$ are each independently of the other hydrogen, $C_1$–$C_2$-

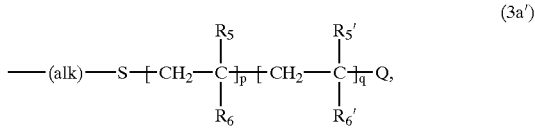

(3a')

wherein (alk) is $C_2$–$C_6$-alkylene, Q is a monovalent group that is suitable to act as a polymerization chain-reaction terminator, p and q are each an integer of from 0 to 100 and the total of (p+q) is from 5 to 100, $R_5$ and $R_5'$ are each independently of the other hydrogen or methyl, and for $R_6$ and $R_6'$ each independently of the other the meanings and preferences given before apply.

A more preferred group of suitable hydrophilic macromonomers according to the invention comprises compounds of formula

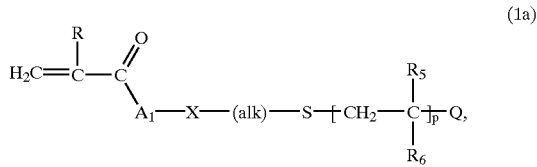

(1a)

wherein R is hydrogen or methyl, $A_1$ is —O—$(CH_2)_{2-4}$—, —O—$CH_2$—CH(OH)—$CH_2$— or a radical —O—$(CH_2)_{2-4}$—NH—C(O)—, X is —O— or —NH—, (alk) is $C_2$–$C_4$-alkylene, Q is a monovalent group that is suitable to act as a polymerization chain-reaction terminator, p is an integer from 5 to 50, $R_5$ is hydrogen or methyl, and for $R_6$ the above given meanings and preferences apply.

A particularly preferred embodiment of the invention relates to hydrophilic macromonomers of the formula

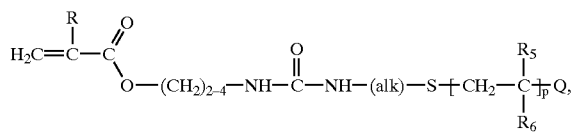

(1b)

wherein for R, $R_5$, $R_6$, Q, (alk) and p the above-given meanings and preferences apply. A particularly preferred group of hydrophilic macromonomers are compounds of the above formula (1b) wherein R is hydrogen or methyl, (alk) is $C_2$–$C_4$-alkylene, $R_5$ is hydrogen or methyl, p is an integer of 5 to 50, 0 is as defined before, and for $R_6$ the above given meanings and preferences apply.

If (oligomer) is a radical (ii) of formula (3b), Q' in formula (3b) is for example $C_1$–$C_{12}$-alkyl, phenyl or benzyl, preferably $C_1$–$C_2$-alkyl or benzyl and in particular methyl. $R_{29}$ is preferably unsubstituted or hydroxy-substituted $C_1$–$C_4$-alkyl and in particular methyl. u is preferably an integer from 2 to 150, more preferably from 5 to 100, even more preferably from 5 to 75 and particularly preferably from 10 to 50.

If (oligomer) is a radical of formula (3b'), the above given meanings and preferences apply for the variables X, $R_{29}$ and u contained therein.

If (oligomer) denotes a radical (iv) of formula (3c), $R_2$ and $R_2'$ are each preferably ethyl or in particular methyl; v is preferably an integer from 2 to 150, more preferably from 5 to 100, even more preferably from 5 to 75 and particularly preferably from 10 to 50; Q" is for example hydrogen; and An⁻ is as defined before.

If (oligomer) denotes an oligopeptide radical (v) of formula (3d) or 3d'), $R_4$ is for example hydrogen, methyl, hydroxymethyl, carboxymethyl, 1-hydroxyethyl, 2-carboxyethyl, isopropyl, n-, sec. or iso-butyl, 4-amino-n-butyl, benzyl, p-hydroxybenzyl, imidazolylmethyl, indolylmethyl or a radical —$(CH_2)_3$—NH—C(=NH)—$NH_2$. t is preferably an integer from 2 to 150, more preferably from 5 to 100, even more preferably from 5 to 75 and particularly preferably from 10 to 50.

In the above formulae (2a), (2b), (2c), (2d) and (2e), the left bond is in each case attached to the double bond whereas the right bond is linked to the oligomer. Formulae (3a) and (3a') are to be understood as a statistic description of the respective oligomeric radicals, that is to say, the orientation of the monomers and the sequence of the monomers, (in case of copolymers) are not fixed in any way by said formulae. The arrangement of B and B' thus may be random or blockwise. Throughout the whole description, —COOH and —$SO_3H$ groups always include suitable salt forms, in particular —COO⁻Ka⁺ and —$SO_3^-$Ka⁺ groups wherein Ka⁺ is a cation such as an alkali metal cation or an ammonium cation.

The weight average molecular weight of the macromonomers of the invention depends principally on the desired properties and is for example from 300 to 12000, preferably from 300 to 8000, more preferably from 300 to 5000, and particularly preferably from 500 to 2000.

The macromonomers of formula (1) may be prepared by methods known per se. For example, the compounds of formula (1) wherein A is a radical of formula (2a), (2b) or (2d) are obtainable by reacting a compound of formula

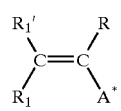

(5)

wherein R, $R_1$ and $R_1'$ each have the above-given meaning and A* is, for example, a group —C(O)—A, wherein A is halogen, particularly chlorine, an ester group an oxyalkylene radical comprising an epoxy group, for example the radical

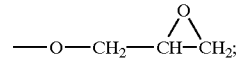

or is a radical —O—$C_2$-$C_{12}$-alkylene-N=C=O; or A* is a radical —$(A_2)_m$—N=C=O, wherein $A_2$ and m have the above-given meaning, with a compound of formula

(6), wherein X has the above-given meaning.

The reactions of a compound of formula (5) having a carboxylic acid halide group, an epoxy group or an isocyanato group with an amino or hydroxy compound of formula (6) are well-known in the art and may be carried out as desribed in textbooks of organic chemistry. For example, the reaction of an isocyanato derivative of formula (5) with a compound of formula (6) may be carried out in an inert organic solvent such as an optionally halogenated hydrocarbon, for example petrolium ether, methylcyclohexane, toluene, chloroform, methylene chloride and the like, or an ether, for example diethyl ether, tetrahydrofurane, dioxane, or a more polar solvent such as DMSO, DMA, N-methylpyrrolidone or even a lower alcohol, at a temperature of from 0 to 100° C., preferably from 0 to 50° C. and particularly preferably at room temperature, optionally in the presence of a catalyst, for example a tertiary amine such as triethylamine or tri-n-butylamine, 1,4-diazabicyclooctane, or a tin compound such as dibutyltin dilaurate or tin dioctanoate. In addition, the reaction of an isocyanato derivative of formula (5) with a compound of formula (6) wherein —XH is an amino group also may be carried out in an aqueous solution in the absence of a catalyst. It is advantageous to carry out the above reactions under an inert atmosphere, for example under an nitrogen or argon atmosphere.

Moreover, the macromonomers of formula (1) wherein A is a radical of formula (2c) or (2e) may be obtained by reacting a compound of formula

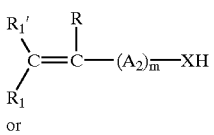 (7a)

or

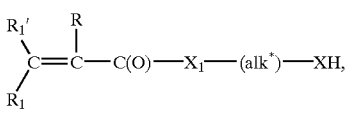 (7b)

wherein R, $R_1$, $R_1'$, $A_2$, X, $X_1$, (alk*) and m each have the above-given meaning, with a compound of formula —$X_1'$(O)C-(oligomer)       (8), wherein (oligomer) has the above-given meaning and $X_1'$ is for example —OH or halogen, in particular chlorine, or together with —(O)C— forms an anhydride group, in a manner known per se.

The macromonomers of formula (1), wherein A is a direct bond and (oligomer) is a radical of formula (3c') are known or may be prepared according to methods known in the art, for example as described in S. Kobayashi et al., Polymer Bulletin 13, p 447–451 (1985).

Likewise, the macromonomers of the formula

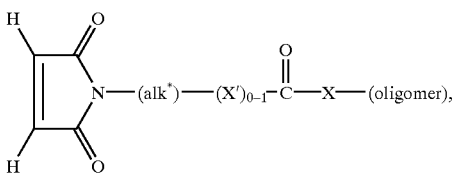 (1c)

wherein (alk*), X', X and (oligomer) each have the above-given meaning, may be obtained in a manner known per se, for example, by reacting a compound of formula

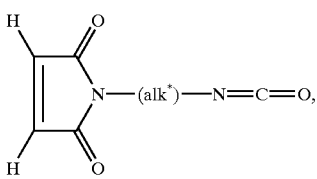 (9)

wherein (alk*) has the above-given meaning, with a compound of the above-given formula (6), or by reacting a compound of formula

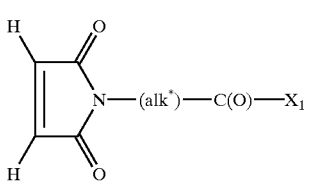 (9a)

with a compound of the above formula (6) wherein (alk*) and $X_1$ each have the above-given meaning.

The compounds of the formula (5), (6), (7a), (7b), (8), (9) and (9a) are known compounds which are commercially available or may be prepared according to known methods. For example, compounds of the formula (6) and (8) wherein (oligomer) denotes a radical of formula (3a) and their manufacture are known for example from PCT application WO 92/09639.

The compounds of formula

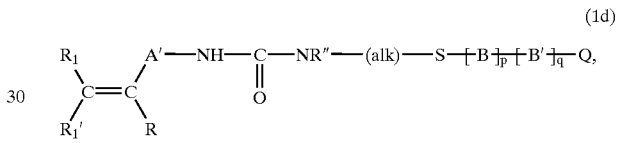 (1d)

wherein for R, $R_1$, $R_1'$, R", (alk), B, B', Q, p and q the above-given meanings and preferences apply, A' is a direct bond, $C_1$–$C_2$-alkylene, phenylene, benzylene or a radical —C(O)— or —C(O)—O—$C_2$–$C_{12}$-alkylene-, are novel and represent a further object of the invention. A preferred embodiment of the invention relates to compounds of the above formula (1d), wherein $R_1$, $R_1'$ and R" are each hydrogen, R is hydrogen or methyl, (alk) is $C_2$–$C_4$-alkylene, q is 0, p is an integer from 5 to 50 and preferably 5 to 20, A' is a radical —C(O)—O—$C_2$–$C_4$-alkylene-, and for B and Q the above given meanings and preferences apply.

The compounds of formula (1d) are obtainable, for example, by reacting an isocyanato compound of formula

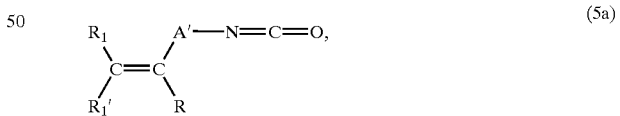 (5a)

wherein R, $R_1$, $R_1'$ and A' each have the above-given meaning, with a telomer of the formula HNR"—(alk)—S-[B-]$_p$[B'-]$_q$Q       (6a), wherein R", B, B', Q, (alk), p and q each have the above-given meaning. under conditions that have been described above. Preferably, the reaction is carried out employing about equimolar amounts of compounds of formulae (5a) and (6a) in an aqueous solution at room temperature under an inert atmosphere.

The compounds of formula

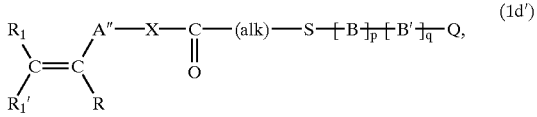

wherein for R, $R_1$, $R_1'$, X, (alk), B, B', Q, p and q the above-given meanings and preferences apply, and A" is a radical $-(A_2)_m-$ or preferably $-C(O)-X_1-(alk^*)-$, wherein for $A_2$, m, $X_1$ and (alk*) the above-given meanings and preferences apply, are also novel and represent a further object of the invention.

The hydrophilic macromonomers may be applied to the initiator-modified bulk material surface and polymerized there according to processes known per se. For example, the bulk material is immersed in a solution of the macromonomer, or a layer of macromonomer is first of all deposited on the modified bulk material surface, for example, by dipping, spraying, spreading, knife coating, pouring, rolling, spin coating or vacuum vapor deposition. The polymerization of the macromonomer on the bulk material surface then may be initiated, for example, thermally by the action of heat or preferably by irradiation, particularly by UV radiation. Suitable light sources for the irradiation are known to the artisan and comprise for example mercury lamps, high pressure mercury lamps, xenon lamps, carbon arc lamps or sunlight. The time period of irradiation may depend for example on the desired properties of the resulting composite material but is usually in the range of up to 30 minutes, preferably from 10 secondes to 10 minutes, and particularly preferably from 0.5 to 5 minutes. It is advantageous to carry out the irradiation in an atmosphere of inert gas. After the polymerization, any non-covalently bonded polymers, oligomers or non-reacted macromonomers formed can be removed, for example by treatment with suitable solvents.

By means of the above-described coating process, the macromonomers may be grafted to the bulk material surface with formation of a coating having for example a so-called bottle brush-type structure (BBT) composed of tethered "hairy" chains. Such BBT structures in one embodiment comprise a long hydrophilic or hydrophobic backbone which carries relatively densely packed comparatively short hydrophilic side chains (called primary bottle brushes). Another embodiment relates to secondary bottle brushes which are characterized in that the hydrophilic side chains themselves carry densely packed hydrophilic "secondary" side chains. Polymeric coatings of said primary and secondary BBT structures to a certain extent mimic highly water-retaining structures occurring in the human body, for example in cartilage or mucosal tissue.

The coating thickness of the macromonomers depends principally on the desired properties. It can be, for example, from 0.001 to 1000 µm, preferably from 0.01 to 500 µm, more preferably from 0.01 to 100 µm, even more preferably from 0.05 to 50 µm, especially preferably from 0.1 to 5 µm and particularly preferably from 0.1 to 1 µm.

A further embodiment of the invention is a biomedical device, e.g. an ophthalmic device, preferably a contact lens including both hard and particularly soft contact lenses, an intraocular lens or artificial cornea, comprising a composite material according to the invention. The inventive materials are further useful for example as wound healing dressings, eye bandages, materials for the sustained release of an active compound such as a drug delivery patch, moldings that can be used in surgery, such as heart valves, vascular grafts, catheters, artificial organs, encapsulated biologic implants, e.g. pancreatic islets, materials for prostheses such as bone substitutes, or moldings for diagnostics, membranes or biomedical instruments or apparatus.

The biomedical devices, e.g. ophthalmic devices according to the invention have a variety of unexpected advantages over those of the prior art which make those devices very suitable for practical purposes,e.g. as contact lens for extended wear or intraocular lens. For example, they do have a high surface wettability which can be demonstrated by their contact angles, their water retention and their water-film break up time or tear film break up time (TBUT).

The TBUT plays an particularly important role in the field of ophthalmic devices such as contact lenses. Thus the facile movement of an eyelid over a contact lens has proven important for the comfort of the wearer; this sliding motion is facilitated by the presence of a continuous layer of tear fluid on the contact lens, a layer which lubricates the tissue/lens interface. However, clinical tests have shown that currently available contact lenses partially dry out between blinks, thus increasing friction between eyelid and the lens. The increased friction results in soreness of the eyes and reduced movement of the contact lenses. Taking into account the average time period between two blinks of an eye it follows that a wettable and biocompatible contact lens should hold a continuous layer of tear fluid for more than 10 seconds and preferably for more than 15 seconds. Whereas current biomedical materials in general have TBUTs of well below 10 seconds and thus do not reach this target, the composite materials of the present invention have TBUTs of >10 seconds and especially >15 seconds. In addition, the TBUT of commercial contact lenses may be improved considerably by applying a surface coating according to the invention. For example, the TBUT of commercial contact lenses such as Focus Dailies™, Focus New Vues® or Lotrafilcon A lenses, may be increased by more than 50% or, according to a particularly preferred embodiment, by ≧100% by applying a surface coating according to the invention. On the base curve of a contact lens, the pronounced lubricity of the coating facilitates the on-eye lens movement which is essential for extended wear of contact lenses. Moreover, the composite materials of the invention provide additional effects being essential for lenses for extended wear, such as an increased thickness of the pre-lens tear film which contributes substantially to low microbial adhesion and resistance to deposit formation. Due to the extremely soft and lubricious character of the novel surface coatings, biomedical articles such as in particular contact lenses made from an inventive composite material show a superior wearing comfort including improvements with respect to late day dryness and long term (overnight) wear. The novel surface coatings moreover interact in a reversible manner with occular mucus which contributes to the improved wearing comfort.

In addition, biomedical devices, e.g. ophthalmic devices such as contact lenses, comprising a composite material of the invention have a very pronounced biocompatibility combined with good mechanical properties. For example, the devices are blood compatible and have a good tissue integration. In addition, there are generally no adverse eye effects observed, while the adsorption of proteins or lipids is low, also the salt deposit formation is lower than with conventional contact lenses. Generally, there is low fouling, low microbial adhesion and low bioerosion while good mechanical properties can be for example found in a low friction coefficient and low abrasion properties. Moreover, the dimensional stability of the composite materials of the invention is excellent. In addition, the attachment of a hydrophilic surface coating at a given bulk material according to the invention does not affect its visual transparency.

In summary, the ophthalmic devices according to the invention, such as contact lenses and artificial cornea, provide a combination of low spoilation with respect to cell debris, cosmetics, dust or dirt, solvent vapors or chemicals, with a high comfort for the patient wearing such opthalmic devices in view of the soft hydrogel surface which for example provides a very good on-eye movement of the ohthalmic device.

Biomedical devices such as renal dialysis membranes, blood storage bags, pacemaker leads or vascular grafts made of the composite materials of the invention resist fouling by proteins by virtue of the continuous layer of bound water, thus reducing the rate and extent of thrombosis. Blood-contacting devices fabricated according to the present invention are therefore haemocompatible and biocompatible.

In the examples, if not indicated otherwise, amounts are amounts by weight, temperatures are given in degrees Celsius. Tear break-up time values in general relate to the pre-lens tear film non-invasive break-up time (PLTF-NIBUT) that is determined following the procedure published by M. Guillon et al., Ophthal. Physiol. Opt. 9, 355–359 (1989) or M. Guillon et al., Optometry and Vision Science 74, 273–279 (1997). Average advancing and receding water contact angles of coated and non-coated lenses are determined with the dynamic Wilhelmy method using a Krüss K-12 instrument (Krüss GmbH, Hamburg, Germany). Wetting force on the solid is measured as the solid is immersed in or withdrawn from a liquid of known surface tension.

EXAMPLE A-1

1,2-Diaminocyclohexane Plasma Coating (DACH)

Two dried Lotrafilcon A lenses (polysiloxane/perfluoropolyether copolymer) are, after extraction in isopropanol, toluene and again in isopropanol, placed on the glass holder within the plasma reactor equipped with an external ring electrode and a 27.13 MHz radiofrequency (RF) generator for the generation of an inductively-coupled, cold glow discharge plasma. The distance between the substrates and the lower edge of the plasma zone is 12 cm. The reactor is evacuated to a pressure of 0.008 mbar, and held at these conditions for one hour. Then, the argon plasma gas flow rate into the plasma zone of the reactor is set to 20 sccm (standard cubic centimeter), the pressure in the reactor is adjusted to 0.12 mbar and the RF generator is switched on. The plasma discharge of a power 250 Watts is maintained for a total period of 1 min (in order to clean and activate the lenses surfaces). Afterward the 1,2-DACH vapor is introduced into the reactor chamber from DACH reservoir (maintained at 24° C.) at 0.15 mbar for 1 min. After this, the following parameters for the plasma polymerization of DACH are chosen: Argon flow rate for plasma excitation=5 sccm, Argon carrier gas flow rate for DACH transport=5 sccm, temperature of the DACH evaporation unit=24° C., the distance between the lower edge of the plasma zone and the substrates=5 cm, pressure=0.2 mbar, and plasma power= 100 W. The lenses are treated for about 5 minutes with a pulsing glow discharge plasma (1 $\mu$sec. on, 3 $\mu$sec. off). After 5 minutes of deposition the plasma discharge is interrupted and DACH vapor is let to flow into the reactor for other 5 minutes. The reactor is then evacuated and maintained for 30 minutes at a pressure 0.008 mbar in order to remove residual monomer and activated spices. The internal pressure is brought to atmospheric by using dry nitrogen. The substrates are then turned over and the whole procedure is repeated to coat the other side of the substrates. The samples are then unloaded from the reactor and used for the subsequent photoinitiator linkage.

EXAMPLE B-1

Surface Binding of Reactive Photoinitiator Molecules

The aminofunctionalized contact lenses from Example A-1 are, immediately after plasma treatment with 1,2-DACH plasma, immersed into 1% acetonitrile solution of the reactive photoinitiator (I) prepared by the addition reaction from isophorone diisocyanate and 4-(2-hydroxyethoxy)phenyl 2-hydroxy-2-propyl ketone (Darocure 2959) (synthesis see EP 0 632 329). The amino groups on the lenses surfaces react with the isocyanato groups of the photoinitiator molecules for 12 hours. After this time, the lenses are withdrawn from the reaction solution, washed and extracted in acetonitrile for 8 hours and dried under reduced pressure for 2 hours. The dried lenses are subsequently used for photografting.

EXAMPLE B-2

Surface Binding of Reactive Photoinitiator Molecules

The aminofunctionalized contact lenses from Example A-1 are, immediately after plasma treatment with 1,2-DACH plasma, immersed into 1% acetonitrile solution of the reactive photoinitiator (II) prepared by the addition reaction from Isophorone diisocyanate and 2-dimethylamino-2-benzyl-1-[4-(2-hydroxyethoxy)phenyl]-butan-1-one (synthesis see WO 96/20796. The amino groups on the lenses surfaces react with the isocyanato groups of the photoinitiator molecules for 16 hours. After this time, the lenses are withdrawn from the reaction solution, washed and extracted in acetonitrile for 12 hours and dried under reduced pressure for 2 hours. The dried lenses are subsequently used for photografting.

Synthesis of Monofunctional Hydrophilic Telomers

EXAMPLE X

Acrylamide Telomer

A 500 ml three-necked round bottom flask is charged with a solution of 5.25 g (46.2 mmol) cysteamine hydrochloride in 270 ml of 0.1 molar aqueous acetic acid. 330 mg (1.2 mmol) a,a'-azodiisobutyramidine dihydrochloride and 42.7 g (600 mmol) acrylamide (Fluka 01696) are added. An intensive cooler is connected to the flask. The apparatus is evacuated to 100 mbar and filled with argon. This is repeated five times. The mixture is heated to 60° C. for three hours and then cooled to room temperature. An analytical sample is freeze-dried and the monomer conversion is determined by $^1$H-NMR spectroscopy. No resonances corresponding to C=C double bonds can be detected, indicating >98% conversion of the monomer.

The pH of the remaining mixture is adjusted to 10.5 by addition of 1 molar sodium hydroxide solution and diluted to a total volume of 600 ml. Salts and residual low molecular weight components are removed by ultrafiltration using a UFP-1-E-4A cartridge from ANG Technology Corporation, Needham, Mass., yielding 31 g product as retentate and 15 g permeate of lower molecular weight. The concentration of amino groups is determined by functional group titration, result 0.43 mmol/g $NH_2$ corresponding to an average molecular weight of the telomer of 2325 g/mol.

EXAMPLE X-1

Acrylamide Telomer

A 1000 mL three-necked round bottom flask is charged with a solution of 17.5 g (154 mmol) cysteamine hydrochloride in 150 deionized water. 1.1 g (4 mmol) α,α'-azodiisobutyramidine dihydrochloride and a solution of 142 g (2 mol) acrylamide (in 450 mL deionized water are added. The pH of the solution is adjusted to pH=3 by addition of 1 molar hydrochloric acid. An intensive cooler and an internal thermometer are connected to the flask. The apparatus is evacuated to 100 mbar and filled with argon. This is repeated five times. The mixture is heated to 60° C. for three hours and then cooled to room temperature. An analytical sample is freeze-dried and the monomer conversion is determined by $^1$H-NMR spectroscopy. No resonances corresponding to C=C double bonds can be detected. The pH of the remaining mixture is adjusted to 10.5 by addition of 1 molar sodium hydroxide solution and diluted to a total volume of 1200 mL. Salts and low molecular weight residues such as unreacted chain transfer agent are removed by reverse osmosis using a Millipore Proscale system equipped with a Millipore Helicon RO-4 Nanomax 50 membrane operating at a pressure of 15 bar. The product is isolated from the obtained retentate by freeze-drying. Yield: 102 g of a white powder. The concentration of amino groups is determined by functional group titration, result 0.22 mmol/g $NH_2$ corresponding to an average molecular weight of the telomer of 4500 g/mol. GPC-analysis indicates a monomodal molecular weight distribution and the absence of high molecular weight polymer.

EXAMPLES X-2–X-7

Acrylamide Telomers

Further acrylamide telomers are obtained by the method as outlined in Example X-1 but using the amounts of acrylamide, chain transfer agent and polymerization initiator as summarized in the Table below.

TABLE

| Example | Acrylamide [g] | Initiator [g] | Chain transfer agent [g] | $M_n$ |
| --- | --- | --- | --- | --- |
| X-2 | 71.1 | 4.9 | 4.9 | 2000 |
| X-3 | 35.5 | 0.7 | 1.0 | 4000 |
| X-4 | 35.5 | 0.7 | 1.0 | 5000 |
| X-5 | 71.1 | 1.4 | 11.0 | 1000 |
| X-6 | 71.1 | 13.1 | 11.0 | 1500 |
| X-7 | 71.1 | 4.9 | 4.1 | 1500 |

The molecular weight was determined via GPC using PEG-standard calibration. The titration of the terminal amino-group was performed in acetic acid using perchloric acid (0.1 N).

EXAMPLE X-8

Acrylamide/Na-acrylate Co-telomer

A 250 mL two-neck round bottom flask with reflux-condenser and rubber septum is charged with a solution of 18 g Acrylamide Telomer from example X-8 in 88 mL of deionized water (100 mL solution). KOH is added to the clear and colourless solution until pH12 is reached. The solution is stirred and heated to 90° C. After 10 hours, a 20 mL sample of solution is taken out of the reactor, cooled to room temperature and purified through dialysis, using Spectrapor membrane tubes with a cut-off at 1000 Da and freeze-dred. A bright-white solid products is obtained comprising a degree of saponification of 9.0% (determination through titration).

EXAMPLE Y

Monoamino-terminated N-acryloyl Morpholine Telomer

A 100 ml three-necked round bottom flask is charged with a solution of 1.6 g (14.3 mmol) cysteamine hydrochloride in 45 ml of 0.1 molar aqueous acetic acid. 55 mg (0.2 mmol) a,a'-azodiisobutyramidine dihydrochloride and 14.1. g (100 mmol) acryloyl morpholine are added. An intensive cooler and an internal thermometer are connected to the flask. The apparatus is evacuated to 100 mbar and filled with argon. This is repeated five times. The mixture is heated to 60° C. for four hours and then cooled to room temperature. An analytical sample is freeze-dried and the monomer conversion is determined by $^1$H-NMR spectroscopy. No resonances corresponding to C=C double bonds can be detected, indicating >98% conversion of the monomer.

The remaining mixture is freeze-dried, dissolved in methanol and the telomer is precipitated in 2 liters of diethyl ether and collected by filtration. Yield: 15 g of a white powder. The telomer is redissolved in 50 ml water and the pH is adjusted to 10.5 by addition of 143 ml 0.1 molar sodium hydroxide solution and then diluted with water to a total volume of 500 ml. Salts and residual low molecular weight components are removed by ultrafiltration using a UFP-1-E-4A cartridge from A/G Technology Corporation, Needham, Mass., yielding 9,2 g product as retentated and 3.8 g permeate of lower molecular weight. The concentration of amino-groups is determined by functional group titration, result 0.54 mmol/g $NH_2$ corresponding to an average molecular weight of the telomer of 1850 g/mol.

EXAMPLE Y-1

Monocarboxy-terminated N-acryloyl Morpholine Telomer

A 1500 mL five-necked sulfonation flask equipped with a mechanical stirrer, an intensive cooler, an internal thermometer, is charged with a solution of 27.7 g (300 mmol) thioglycolic acid in 400 mL deionized water. 488 mg (1.8 mmol) α,α'-azodiisobutyramidine dihydrochloride and 127.1 g (900 mmol) acryloyl morpholine are added. The apparatus is evacuated to 100 mbar and filled with argon. This is repeated five times. The mixture is heated to 60° C. for four hours and then cooled to room temperature. An analytical sample is freeze-dried and the monomer conversion is determined by $^1$H-NMR spectroscopy. No resonances corresponding to C=C double bonds can be detected, indicating >98% conversion of the monomer. The remaining mixture is adjusted to pH=5 by addition of 30% KOH solution. Salts and low molecular weight residues such as unreacted chain transfer agent are removed by reverse osmosis using a Millipore Proscale system equipped with a Millipore Helicon RO-4 Nanomax 50 membrane operating at a pressure of 15 bar. The product is isolated from the obtained retentate by freeze-drying. Yield: 124 g of a white powder. The concentration of carboxylic acid groups is determined by functional group titration, result 1.84 mmol/g COOH corresponding to an average molecular weight of the telomer of 543 g/mol. GPC-analysis indicates a monomodal molecular weight distribution and the absence of high molecular weight polymer.

EXAMPLE Y-2

N-acryloyl morpholine/2-hydroxyethyl acrylamide co-telomer

A 1000 mL three-necked round bottom flask is charged with a solution of 28.4 g (250 mmol) cysteamine hydrochloride in 400 mL deionized water. 407 mg (1.5 mmol) α,α'-azodiisobutyramidine dihydrochloride and 70.6 g (500 mmol) acryloyl morpholine and 28.8 g (250 mmol) N-hydroxyethyl acrylamide are added. An intensive cooler and an internal thermometer are connected to the flask. The apparatus is evacuated to 100 mbar and filled with argon. This is repeated five times. The mixture is heated to 60° C. for four hours and then cooled to room temperature. An analytical sample is freeze-dried and the monomer conversion is determined by $^1$H-NMR spectroscopy. No resonances corresponding to C=C double bonds can be detected, indicating >98% conversion of the monomer. The remaining mixture is adjusted to pH=10 by addition of 30% KOH solution. Salts and low molecular weight residues such as unreacted chain transfer agent are removed by reverse osmosis using a Millipore Proscale system equipped with a Millipore Helicon RO-4 Nanomax 50 membrane operating at a pressure of 15 bar. The product is isolated from the obtained retentate by freeze-drying. Yield: 85 g of a white powder. The concentration of amino-groups is determined by functional group titration, result 0.95 mmol/g $NH_2$ corresponding to an average molecular weight of the co-telomer of 1050 g/mol. GPC-analysis indicates a monomodal molecular weight distribution and the absence of high molecular weight polymer.

EXAMPLE Y-3

Telomer from 2-Hydroxy-3-methacryloxypropyl trimethylammonium Chloride

A 100 mL three-necked round bottom flask is charged with a solution of 0.92 g (10 mmol) thioglycolic acid in 50 mL deionized water. 27 mg (0.1 mmol) α,α'-azodiisobutyramidine dihydrochloride and 11.9 g (50 mmol) of 2-Hydroxy-3-methacryloxypropyl trimethylammonium chloride are added. The pH of the solution is adjusted to pH 3 by addition of 4 molar hydrochloric acid. An intensive cooler is connected to the flask. The apparatus is evacuated to 100 mbar and filled with argon. This is repeated five times. The mixture is heated to 60° C. for three hours and then cooled to room temperature. An analytical sample is freeze-dried and the monomer conversion is determined by $^1$H-NMR spectroscopy. No resonances corresponding to C=C double bonds can be detected, indicating >98% conversion of the monomer. The product is isolated by precipitation of the aqueous solution into 2000 mL acetone. The precipitate is filtered off and vacuum dried. Yield 10.2 g white, very hygroscopic solid. The concentration of carboxylic acid-groups is determined by functional group titration, result 0.41 mmol/g COOH corresponding to an average molecular weight of the telomer of 2440 g/mol.

EXAMPLE Z

Telomer from mono-isocyanatoethyl methacrylato trehalose

A 100 ml three-necked round bottom flask is charged with a solution of 3.8 g (33.4 mmol) cysteamine hydrochloride in 45 ml of 0.1 molar aqueous acetic acid. 55 mg (0.2 mmol) a,a'-azodiisobutyramidine dihydrochloride and 53 g (106 mmol) of the monoadduct of IEM and trehalose are added. An intensive cooler and an internal thermometer are connected to the flask. The apparatus is evacuated to 100 mbar and filled with argon. This is repeated five times. The mixture is heated overnight to 60° C. and then cooled to room temperature. The product is precipitated in 2 liters of acetone and isolated by filtration, yielding 53.6 g of a slightly yellow colored powder. No resonances corresponding to C=C double bonds can be detected by $^1$H-NMR spectroscopy, indicating >98% conversion of the monomer. 17.3 g of the product are dissolved in 200 ml water and the pH is adjusted to 10.5 by addition of 107 ml 0.1 molar sodium hydroxide solution and then diluted with water to a total volume of 500 ml. Salts and residual low molecular weight components are removed by ultrafiltration using a UFP-1-E-4A cartridge from A/G Technology Corporation, Needham, Mass., yielding 14.3 g product as retentate and 2.5 g permeate of lower molecular weight. The concentration of amino-groups is determined by functional group titration, result 0.12 mmol/g $NH_2$ corresponding to an average molecular weight of the telomer of 8300 g/mol and a degree of polymerization of 16.

EXAMPLE Z-1

Oligoethyleneoxide methacrylate Telomer

A 250 mL three-necked round bottom flask is charged with a solution of 34 mg (0.125 mmol) α,α'-azodiisobutyramidine dihydrochloride dissolved in 50 mL methanol. 20 g (45.6 mmol) mono-amino terminated polyethylene oxide (Blemer® PE 350 from NOF Corporation $M_W$=about 400) and 1.8 g (15.2 mmol) 2-(BOC-amino) ethane thiol are added. An intensive cooler is connected to the flask. The apparatus is evacuated to 100 mbar and filled with argon. This is repeated five times. The mixture is heated overnight to 60° C. and then cooled to room temperature. An analytical sample is removed and the solvent evaporated. The monomer conversion is determined by $^1$H-NMR spectroscopy. No resonances corresponding to C=C double bonds can be detected, indicating >98% conversion of the monomer. The product is isolated by evaporation of the solvent. Yield 21 g of a clear, colorless and viscous liquid. The concentration of BOC-protective groups is determined by titration as 0.34 mmol/g, corresponding to an average molecular weight of the telomer of 2900 g/mol. The BOC-protective groups are removed by a treatment of the product in an acidic medium. Synthesis of macromonomers of formula (1)

EXAMPLE C-1

Preparation of IEM-functionalized acrylamide Telomer Solution 7.5 g of acrylamide telomer with amino end group (amine titration=0.43 mEq/g), prepared by Example X are dissolved in 80 ml of HPLC water. Argon is then let to bubble through the solution for the period of about 30 minutes. This mixture is then added to the equimolar amount (0.5 g) of isocyanatoethyl methacrylate (IEM, isocyanate titration=6.45 mEq/g) under stirring. The whole mixture is then stirred under argon flow for 4 hours. The mixture is then filtered through 0.45 μm Teflon filter, degassed with argon in order to remove oxygen and used for photografting.

Examples C-1(a)–C-1(c): Further IEM-functionalized acrylamide telomers are obtained by the method of Example C-1 using the amounts of telomer, water and IEM as outlined in the Table below.

| Ex. | Telomer of Example | Amount telomer [g] | Amount water [ml] | Amount IEM [g] |
|---|---|---|---|---|
| C-1 (a) | X-1 | 12.5 | 85 | 0.45 |
| C-1 (b) | X-2 | 2.2 | 28 | 0.1 |
| C-1 (c) | X-3 | 2.0 | 20 | 0.05 |

EXAMPLE C-2

Preparation of IEM-functionalized N-acryloylmorpholine Telomer Solution 6.2 g of acryloylmorpholine telomer with amino end group (amine titration=0.54 mEq/g), prepared by Example Y are dissolved in 80 ml of HPLC water. Argon is then let to bubble through the solution for the period of about 30 minutes. This mixture is then added to the equimolar amount (0.52 g) of isocyanatoethyl methacrylate (IEM, isocyanate titration=6.45 mEq/g) under stirring. The whole mixture is then stirred under argon flow for 4 hours. The a mixture is then filtered through 0.45 μm Teflon filter, degassed with argon in order to remove oxygen and used for photografting.

EXAMPLE C-3

Preparation of IEM-functionalized α,α'-mono-IEM-trehalose Telomer Solution 6.45 g of 6-O-carbamoylmethacryloylethyl-α,α'-trehalose telomer with amino end group (amine titration=0.12 mEq/g), prepared by Example Z are dissolved in 80 ml of HPLC water. The solution is then degassed by bubbling nitrogen through the solution for 30 minutes. This solution is then added to the equimolar amount (0.12 g) of isocyanatoethyl methacrylate (IEM, isocyanate titration=6.45 mEq/g) under stirring. The whole mixture is then stirred under argon flow for 4 hours. The mixture is then filtered through 0.45 μm Teflon filter, degassed with argon in order to remove oxygen and used for photografting.

EXAMPLE C-4

Preparation of a N-acryloyl Morpholine Macromonomer 54.3 g (100 mmol) of the carboxy-terminated telomer of Example Y-1 are dissolved in 100 mL of dry THF. 20.85 g (101 mmol) N,N-dicyclohexyl carbodiimid and 1.22 g (10 mmol) 4-dimethylamino pyridine and 11.5 g (100 mmol) N-hydroxyethyl acrylamide are added and the mixture heated to 40° C. for 4 hours. The mixture is cooled to room temperature and the precipitated dicyclohexyl urea is removed by filtration. The macromer is isolated by evaporation of the solvent. Yield 64.8 g. Concentration of C=C double bonds is determined by endgroup-titration: 1.54 mmol/g. No residual hydroxyl- or carboxylic acid functions are detected.

EXAMPLE C-5

Preparation of IEM-functionalized hydroxyethyl acrylamide N-acryloyl mompholine Co-telomer Solution 2.15 g of co-telomer of Example Y-2 (amine titration=0.95 mEq/g corresponding to an average molecular weight of the telomer of 1050 g/mol) are dissolved in 22 ml of HPLC water. Argon is then let to bubble through the solution for the period of about 30 minutes. 0.32 g of isocyanatoethyl methacrylate (IEM, isocyanate titration=6.45 mEq/g) are then slowly added to the solution under stirring. The whole mixture is then stirred under argon flow for 12 hours. No isocyanate groups are detected in the solution by FTIR measurements. The mixture is then filtered through 0.20 μm Teflon filter, degassed with pure nitrogen for 2×30 minutes in order to remove oxygen and used for photografting.

Preparation of Surface Grafted Coatings

EXAMPLE D-1

Photografting of IEM-functionalized acrylamide Telomers onto the Contact Lens Surface 1 ml of the IEM-functionalized acrylamide telomer solution from Example C-1 is introduced into a small Petri dish of a volume of about 3 ml in a glove box. The dried lens from Example B-1, carrying covalently linked photoinitiator molecules on its surface, is then place into this solution and an additional 1 ml of the degassed solution is added on the lens in order to cover the whole lens with the solution. After 15 minutes, the Petri dish with the lens in the solution is exposed to 15 mW ultraviolet light for a period of about 3 minutes. The lens is then turned over and the exposition is repeated by applying 15 mW UV light for an additional 3 minutes. The modified lens is then withdrawn from the solution, washed twice in destilled water, continuously extracted in ultra pure water for 16 h and analysed by Atomic Force Microscopy (AFM), Environmental Scanning Electron Microscopy (ESEM), Fourier Transform Infrared-Attenuated Total Reflection Mode (FTIR-ATR) and contact angle measurements. The thickness of the coating is in the range of 300–400 nm as determined by ESEM. FTIR-ATR confirms polyacrylamide-like structure of the coating. Water/air contact angles on the modified lens are 90 advancing (adv.)., 3° receding (rec.), 6° hysteresis. In comparison, the contact angles of non-modified lens are 101° adv., 64° rec., 37° hysteresis. The lens holds a continuous water layer on the surface for over 1 minute; the pre-lens tear film non-invasive break-up time (PLTF-NIBUT) of the coated surface after 6 hours of wear is more than twice as long as that of a commercial Focus Dailies™ contact lens (=the average TBUT is 208% of the TBUT of Focus Dailies™).

EXAMPLES D-1(a)–D-1(c)

According to the method of Example D-1, further IEM-functionalized acrylamide telomers are photografted onto a contact lens surface which are summarized below.

D-1(a): macromonomer solution of Example C-1(a); the thickness of the coating is in the range of 800–1400 nm as determined by ESEM. ATR-FTIR confirms polyacrylamide-like structure of the coating; water/air contact angles on the modified lens are 0° adv., 0° rec., 0° hysteresis; in comparison, the contact angles of non-modified lens are 101° adv., 64° rec., 37° hysteresis; the lens holds a continuous water layer on the surface for over 2 minutes; the pre-lens tear film non-invasive break-up time (PLTF-NIBUT) of the coated surface after 6 hours of wear is about 64% higher than that of a commercial Focus New Vues™ contact lens (=the average TBUT is 164% of the TBUT of Focus New Vues™).

D-1(b): macromonomer solution of Example C-1(b); water/air contact angles on the modified lenses are 18° adv., 12° rec., 6° hysteresis.

D-1(b): macromonomer solution of example C-1(b), but instead of 3 minutes of exposition, 2 minutes exposition time is used for photografting; water/air contact angles on the modified lenses are 38° adv., 22° rec., 16° hysteresis.

D-1(c): macromonomer of Example C-1(c); water/air contact angles on the modified lenses were 32° adv., 16° rec., 16° hysteresis.

EXAMPLE D-2

Photografting of IEM-functionalized acrylamide Telomers onto the Contact Lens Surface Two lenses from Example B-1 are coated in accordance with Example D-1, but instead of 3 minutes of exposition, 2 minutes exposition time is used for photografting. Water/air contact angles on the modified lenses are 12° adv., 6° rec., 6° hysteresis.

EXAMPLE D-3

Photografting of IEM-functionalized N-acryloylmorpholine Telomers onto the Contact Lens Surface 1 ml of the IEM-functionalized acryloylmorpholine telomer solution from Example C-2 is introduced into a small Petri dish of a volume of about 3 ml in a glove box. The dried lens from Example B-1, carrying covalently linked photoinitiator molecules on its surface, is then placed into this solution and an additional 1 ml of the degassed solution are added on the lens in order to cover the whole lens with the solution. After 15 minutes, the Petri dish with the lens in the solution is exposed to 15 mW ultraviolet light for a period of about 3.5 minutes. The lens is then turned over and the exposition is repeated by applying 15 mW UV light for an additional 3.5 minutes. The modified lens is then withdrawn from the solution, washed twice in destined water, continuously extracted in ultra pure water for 16 h and analyzed by ESEM, FTIR-ATR and contact angle measurements. The thickness of the coating is in the range of 200–300 nm as determined by ESEM. FTIR-ATR confirms polyacryloylmorpholine-like structure of the coating. Water/air contact angles on the modified lens are 17° adv., 9° rec., 8° hysteresis. In comparison, the contact angles of non-modified lens are 101° adv., 64° rec., 37° hysteresis. The lens holds continuous water layer on the surface for over 1 minute.

EXAMPLE D-4

Photografting of the N-acryloylmorpholine Macromonomer from Example C-4 onto the Contact Lens Surface A 10% aqueous solution is prepared by dissolving of 0.5 g of the reactive macromer, prepared by Example C-4 in 4.5 ml water. The solution is then degassed by evacuation of the solution to a pressure of about 5–6 mbar and by argon bubling through the solution for 20 minutes. 1 ml of the solution is then introduced into a small Petri dish of a volume of about 3 ml in a glove box. The dried lens from Example B-1, carrying covalently linked photoinitiator molecules on its surface, are then placed into this solution and an additional 1 ml of the degassed solution is added on the lens in order to cover the whole lens with the solution. After 15 minutes, the Petri dish with the lens in the solution is exposed to 15 mW ultraviolet light for a period of 3 minutes. The lens is then turned over and the exposition was repeated by applying 15 mW UV light for an additional 3 minutes. The modified lens is then withdrawn from the solution, washed twice in distilled water, continuously extracted in ultra pure water for 16 h and analyzed by FTIR-ATR and contact angle measurements. FTIR-ATR spectra confirm a polyacryloylmorpholine-like structure of the coating. Water/air contact angles on the modified lens are 19° adv., 9° rec., 10° hysteresis. In comparison, the contact angles of non-modified lens are 101° adv., 64° rec., 37° hysteresis.

EXAMPLE D-5

Photografting of IEM-functionalized $\alpha,\alpha'$-mono-IEM-trehalose Telomers onto the Contact Lens Surface 1 ml of the IEM-functionalized $\alpha,\alpha'$-mono-IEM-trehalose telomer solution from Example C-3 is introduced into a small Petri dish of a volume of about 3 ml in a glove box. The dried lens from Example B-1, carrying covalently linked photoinitiator molecules on its surface, is then placed into this solution and an additional 1 ml of the degassed solution are added on the lens in order to cover the whole lens with the solution. After 15 minutes, the Petri dish with §the lens in the solution is exposed to 15 mW ultraviolet light for a period of about 3.5 minutes. The lens is then turned over and the exposition is repeated by applying 15 mW UV light for an additional 3.5 minutes. The modified lens is then withdrawn from the solution, washed twice in destined water, continuously extracted in ultra pure water for 16 h and analyzed by ESEM and contact angle measurements. The thickness of the coating is in the range of 250–300 nm as determined by ESEM. Water/air contact angles on the modified lens are 15° adv., 10° rec., 5° hysteresis. In comparison, the contact angles of non-modified lens are 101° adv., 64° rec., 37° hysteresis. The lens holds a continuous water layer on the surface for over 1 minute.

EXAMPLE D-6

Photografting of IEM-functionalized hydroxyethyl acrylamide N-acryloyl morpholine Co-telomer onto the Contact Lens Surface 1 ml of the IEM-functionalized co-telomer solution from Example C-5 is introduced into a small Petri dish of a volume of about 3 ml in a glove box. The dried lens from Example B-1, carrying covalently linked photoinitiator molecules on its surface, are then placed into this solution and an additional 1 ml of the degassed solution is added on the lens in order to cover the whole lens with the solution. After 15 minutes, the Petri dish with the lens in the solution is exposed to 15 mW ultraviolet light for a period of about 2 minutes. The lens is then turned over and the exposition is repeated by applying 15 mW UV light for an additional 2 minutes. The modified lens is then withdrawn from the solution, washed twice in destilled water, continuously extracted in ultra pure water for 16 h and analyzed by contact angle measurements. Water/air contact angles on the modified lens are 43° adv., 25° rec., 18° hysteresis. In comparison, the contact angles of non-modified lens are 101° adv., 64° rec., 37° hysteresis. The lens holds a continuous water layer on the surface for over 1 minute.

EXAMPLE D-7

Photografting of a Reactive poly(2-methyl-2-oxazoline) Macromonomer onto the Contact Lens Surface An aqueous solution is prepared by dissolving of 1.2 g of a reactive macromonomer of formula

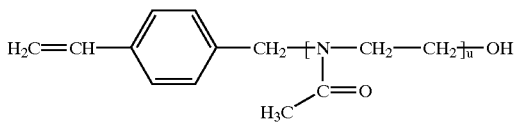

(poly(2-methyl-2-oxazoline) having a styryl group as polymerizable function, weight average molecular weight $M_W$=about 1500, synthesis see S. Kobayashi et al., Polymer Bulletin 13, p 447–451 (1985)) in 13 ml water. The solution is then degassed by evacuation of the solution to a pressure of about 5–6 mbar and by argon bubling through the solution for 30 minutes. 1 ml of the solution is then introduced into a small Petri dish of a volume of about 3 ml in a glove box. The dried lens from Example B-1, carrying covalently linked photoinitiator molecules on its surface, is then placed into this solution and an additional 1 ml of the degassed solution is added on the lens in order to cover the whole lens with the solution. After 15 minutes, the Petri dish with the lens in the solution is exposed to 15 mW ultraviolet light for a period of 3 minutes. The lens is then turned over and the exposition was repeated by applying 15 mW UV light for an additional 3 minutes. The modified lens is then withdrawn from the solution, washed twice in distilled water, continuously extracted in ultra pure water for 16 h and analyzed by contact angle measurements. Water/air contact angles on the modified lens are 57° adv., 35° rec., 22° hysteresis. In comparison, the contact angles of a non-modified lens are 101° adv., 64° rec., 37° hysteresis.

EXAMPLE D-8

Photografting of a Mixture of IEM-functionalized N-acryloyl morpholine Telomer and IEM-functionalized Acrylamide Telomer onto the Contact Lens Surface 2 ml of the degassed solution from C-1 and 2 ml of the degassed solution from C-2 were mixed together and stirred for 5 minutes. 1 ml of the mixture is then introduced into a small Petri dish of a volume of about 3 ml in a glove box. The dried lens from Example B-1, carrying covalently linked photoinitiator molecules on its surface, is then placed into this solution and an additional 1 ml of the degassed solution is added on the lens in order to cover the whole lens with the solution. After 15 minutes, the Petri dish with the lens in the solution is exposed to 15 mW ultraviolet light for a period of about 2 minutes. The lens is then turned over and the exposition was repeated by applying 15 mW UV light for an additional 2 minutes. The modified lens is then withdrawn from the solution, washed twice in distilled water, continuously extracted in ultra pure water for 6 h and analyzed by contact angle measurements. Water/air contact angles on the modified lens are 26° adv., 19° rec., 7° hysteresis. In comparison, the contact angles of a non-modified lens are 101° adv., 64° rec., 37° hysteresis.

What is claimed is:

1. A composite material comprising
    (a) an inorganic or organic bulk material having covalently bonded to its surface initiator moieties for radical polymerization; and
    (b) a hydrophilic surface coating obtainable by applying one or more different ethylenically unsaturated hydrophilic macromonomers to the bulk material surface provided with the initiator radicals and polymerizing said macromonomers,
    wherein the macromonomers according to (b) are each of formula

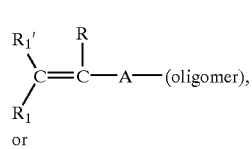

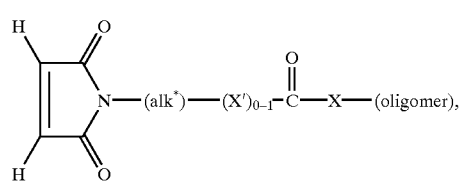

wherein
    $R_1$ is hydrogen, $C_1$–$C_6$-alkyl or a radical —COOR';
    R, R' and $R_1'$ are each independently of the other hydrogen or $C_1$–$C_6$-alkyl;
    A is a direct bond or is a radical of formula

or

or

or

or

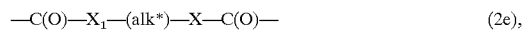

wherein $A_1$ is —O—$C_2$–$C_{12}$-alkylene which is unsubstituted or substituted by hydroxy, or is —O—$C_2$–$C_{12}$-alkylene-NH—C(O)— or —O—$C_2$–$C_{12}$-alkylene-O—C(O)—NH—$R_{11}$—NH—C(O)—,
wherein $R_{11}$ is linear or branched $C_1$–$C_{18}$-alkylene or unsubstituted or $C_1$–$C_4$-alkyl- or $C_1$–$C_4$-alkoxy-substituted $C_6$–$C_{10}$-arylene, $C_7$–$C_{18}$-aralkylene, $C_6$–$C_{10}$-arylene-$C_1$–$C_2$-alkylene-$C_6$–$C_{10}$-arylene, $C_3$–$C_8$-cycloalkylene, $C_3$–$C_8$-cycloalkylene-$C_1$–$C_6$-alkylene, $C_3$–$C_8$-cycloalkylene-$C_1$–$C_2$-alkylene-$C_3$–$C_8$-cycloalkylene or $C_1$–$C_6$-alkylene-$C_3$–$C_8$-cycloalkylene-$C_1$–$C_6$-alkylene,
    $A_2$ is $C_1$–$C_8$-alkylene; phenylene or benzylene,
    m and n are each independently of the other the number 0 or 1,
    X, $X_1$ and X' are each independently of the other a bivalent group —O— or —NR",
wherein
    R" is hydrogen or $C_1$–$C_6$-alkyl,
    (alk*) is $C_2$–$C_{12}$-alkylene;
    and (oligomer) denotes
    (i) the radical of a telomer of formula

wherein (alk) is $C_2$–$C_{12}$-alkylene,

Q is a monovalent group that is suitable to act as a polymerization chain-reaction terminator, p is an integer from 2 to 250 and q is an integer from 0 to 100, wherein the total of (p+q) is an integer from 2 to 250, and B and B' are each independently of the other a 1,2-ethylene radical derivable from a copolymerizable vinyl monomer by replacing the vinylic double bond by a single bond, at least one of the radicals B and B' being substituted by a hydrophilic substituent; or (ii) the radical of an oligomer of the formula

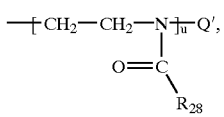
(3b)

wherein $R_{28}$ is hydrogen or unsubstituted or hydroxy-substituted $C_1$–$C_{12}$-alkyl, u is an integer from 2 to 250 and Q' is a radical of a polymerization initiator; or (iii) the radical of formula

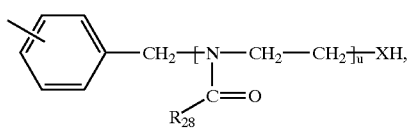
(3b')

wherein $R_{28}$, X and u are as defined above, or (iv) the radical of an oligomer of formula

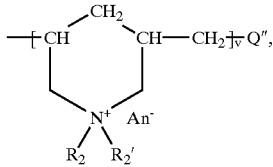
(3c)

wherein $R_2$ and $R_2'$ are each independently $C_1$–$C_4$-alkyl, An⁻ is an anion, v is an integer from 2 to 250, and Q" is a monovalent group that is suitable to act as a polymerization chain-reaction terminator; or (v) the radical of an oligopeptide of formula —(CHR$_4$—C(O)—NH)$_t$—CHR$_4$—COOH (3d)

or

—CHR$_4$—(NH—C(O)—CHR$_4$)$_t$—NH$_2$ (3d'), wherein $R_4$ is hydrogen or $C_1$–$C_4$-alkyl which is unsubstituted or substituted by hydroxy, carboxy, carbamoyl, amino, phenyl, o-, m- or p-hydroxyphenyl, imidazolyl, indolyl or a radical —NH—C(=NH)—NH$_2$ and t is an integer from 2 to 250, or the radical of an oligopeptide based on proline or hydroxyproline; subject to the provisos that in case of (oligomer) being a radical of formula (3a), A is not a direct bond;

in case of (oligomer) being a radical of formula (3b), (3c) or (3d), A is a radical of formula (2a), (2b), or (2d) or the macromer is of formula (1');

in case of (oligomer) being a radical of formula (3b'), A is a direct bond;

in case of (oligomer) being a radical of formula (3d'), A is a radical of formula (2c) or (2e).

2. A composite material according to claim 1, wherein the bulk material is a natural or synthetic organic polymer having covalently bonded to its surface polymerization initiator radicals that thermally or photochemically initiate the radical polymerization of ethylenically unsaturated hydrophilic macromonomers.

3. A composite material according to claim 1, wherein the bulk material (a) of the composite material is a natural or synthetic organic polymer containing H-active groups on the surface that are coreactive with isocyanato groups, some or all of whose H atoms have been substituted by radicals of the formulae

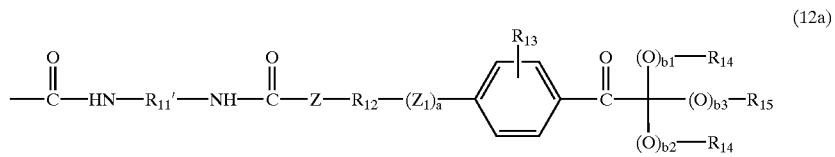
(12a)

or

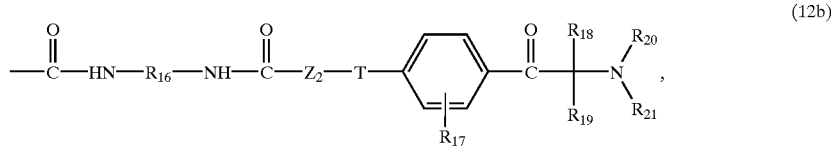
(12b)

wherein Z is bivalent —O—, —NH— or —NR$_{22}$—;

$Z_1$ is —O—, —O—(O)C—, —C(O)—O— or —O—C(O)—O—;

$R_{13}$ is H, $C_1$–$C_{12}$-alkyl, $C_1$–$C_{12}$-alkoxy or N—$C_1$–$C_{12}$-alkylamino;

$R_{14}$ and $R_{15}$ are each independently of the other H, linear or branched $C_1$–$C_8$-alkyl, $C_1$–$C_8$-hydroxyalkyl or $C_6$–$C_{10}$-aryl, or the groups $R_{14}$—(O)$_{b1}$— and $R_{14}$—(O)$_{b2}$— together are —(CH$_2$)$_c$— wherein c is an integer from 3 to 5, $R_{12}$ is a direct bond or linear or branched $C_1$–$C_8$-alkylene that is unsubstituted or substituted by —OH and/or is uninterrupted or interrupted by one or more groups —O—, —O—C(O)— or —O—C(O)—O—;

$R_{11}'$ is branched $C_3$–$C_{18}$-alkylene, unsubstituted or $C_1$–$C_4$-alkyl- or $C_1$–$C_4$-alkoxy-substituted $C_6$–$C_{10}$- arylene, or unsubstituted or $C_1$–$C_4$-alkyl- or $C_1$–$C_4$-alkoxy-substituted $C_7$–$C_{18}$-aralkylene, unsubstituted or $C_1$–$C_4$-alkyl- or $C_1$–$C_4$-alkoxy-substituted $C_3$–$C_8$-cycloalkylene, unsubstituted or $C_1$–$C_4$-alkyl- or $C_1$–$C_4$-alkoxy-substituted $C_3$–$C_8$-cycloalkylene-$C_yH_{2y}$— or unsubstituted or $C_1$–$C_4$-alkyl- or $C_1$–$C_4$-alkoxy-substituted —$C_yH_{2y}$—($C_3$–$C_8$-cycloalkylene)-$C_yH_{2y}$— wherein y is an integer from 1 to 6;

$R_{16}$ independently has the same definitions as $R_{11}'$ or is linear $C_3$–$C_{18}$-alkylene;

$R_{22}$ is linear or branched $C_1$–$C_6$-alkyl;

T is bivalent —O—, —NH—, —S—, $C_1$–$C_8$-alkylene or

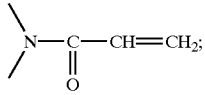

$Z_2$ is a direct bond or —O—$(CH_2)_d$— wherein d is an integer from 1 to 6 and the terminal $CH_2$ group of which is linked to the adjacent T in formula (10c);

$R_{17}$ is H, $C_1$–$C_{12}$-alkyl, $C_1$–$C_{12}$-alkoxy, N—$C_1$–$C_{12}$-alkylamino or —$NR_{25}R_{26}$ wherein $R_{25}$ is $C_1$–$C_8$-alkyl and $R_{26}$ is H or $C_1$–$C_8$-alkyl;

$R_{18}$ is linear or branched $C_1$–$C_8$-alkyl, $C_2$–$C_8$-alkenyl or $C_6$–$C_{10}$-aryl-$C_1$–$C_8$-alkyl;

$R_{19}$ independently of $R_{18}$ has the same definitions as $R_{18}$ or is $C_6$–$C_{10}$-aryl, or $R_{18}$ and $R_{19}$ together are —$(CH_2)_e$— wherein e is an integer from 2 to 6;

$R_{20}$ and $R_{21}$ are each independently of the other linear or branched $C_1$–$C_6$-alkyl that may be substituted by $C_1$–$C_4$-alkoxy, or $C_6$–$C_{10}$-aryl-$C_1$–$C_8$-alkyl or $C_2$–$C_8$-alkenyl; or $R_{20}$ and $R_{21}$ together are —$(CH_2)_{f1}$—$Z_3$—$(CH_2)_{f2}$— wherein $Z_3$ is a direct bond, —O—, —S— or —$NR_{26}$—, and $R_{26}$ is H or $C_1$–$C_8$-alkyl and f1 and f2 are each independently of the other an integer from 2 to 4; and a, b1, b2 and b3 are each independently of the other 0 or 1;

subject to the provisos that b1 and b2 are each 0 when $R_{15}$ is H; that the total of (b1+b2+b3) is not exceeding 2; and that a is 0 when $R_{12}$ is a direct bond.

4. A composite material according to claim 3, wherein the bulk material (a) is an organic polymer containing H-active —OH, —$NH_2$ and/or —NH— groups on its surface, some or all of whose H atoms have been substituted by radicals of the formulae (12a) or (12b).

5. A composite material according to claim 1, wherein the hydrophilic macromonomer is a compound of formula (1), wherein R is hydrogen or methyl, $R_1$ is hydrogen, methyl or carboxyl, $R_1'$ is hydrogen and A is a radical of the formula (2a) or (2b).

6. A composite material according to claim 1, wherein the hydrophilic macromonomer is a compound of formula (1), wherein R is hydrogen or methyl, $R_1$ is hydrogen, methyl or carboxyl, $R_1'$ is hydrogen and A is a radical of the formula (2e).

7. A composite material according to claim 1, wherein the hydrophilic macromonomer is a compound of formula (1), wherein (oligomer) is the radical of a telomer of formula (3a).

8. A composite material according to claim 1, wherein the hydrophilic substituent of B or B' is a non-ionic substituent selected from the group consisting of a radical $C_1$–$C_6$-alkyl which is substituted by one or more same or different substituents selected from the group consisting of —OH, $C_1$–$C_4$-alkoxy and —$NR_9R_9'$, wherein $R_9$ and $R_9'$ are each independently of another hydrogen or unsubstituted or hydroxy-substituted $C_1$–$C_6$-alkyl or phenyl; phenyl which is substituted by hydroxy, $C_1$–$C_4$-alkoxy or —$NR_9R_9'$, wherein $R_9$ and $R_9'$ are as defined above; a radical —COOY, wherein Y is $C_1$–$C_{24}$-alkyl which is unsubstituted or substituted by hydroxy, $C_1$–$C_4$-alkoxy, —O—Si$(CH_3)_3$, —$NR_9R_9'$ wherein $R_9$ and $R_9'$ are as defined above, a radical —O—$(CH_2CH_2O)_{1-24}$—E wherein E is hydrogen or $C_1$–$C_6$-alkyl, or a radical —NH—C(O)—O—G, wherein —O—G is the radical of a saccharide with 1 to 8 sugar units or is a radical —O—$(CH_2CH_2O)_{1-24}$—E, wherein E is as defined above, or Y is $C_5$–$C_8$-cycloalkyl which is unsubstituted or substituted by $C_1$–$C_4$-alkyl or $C_1$–$C_4$-alkoxy, or is unsubstituted or $C_1$–$C_4$-alkyl- or $C_1$–$C_4$-alkoxy-substituted phenyl or $C_7$–$C_{12}$-aralkyl; —$CONY_1Y_2$ wherein $Y_1$ and $Y_2$ are each independently hydrogen, $C_1$–$C_{12}$-alkyl, which is unsubstituted or substituted for example by hydroxy, $C_1$–$C_4$-alkoxy or a radical —O—$(CH_2CH_2O)_{1-24}$—E wherein E is as defined above, or $Y_1$ and $Y_2$ together with the adjacent N-atom form a five- or six-membered heterocyclic ring having no additional heteroatom or one additional oxygen or nitrogen atom; a radical —$OY_3$, wherein $Y_3$ is hydrogen; or $C_1$–$C_{12}$-alkyl which is unsubstituted or substituted by —$NR_9R_9'$; or is a radical —C(O)—$C_1$–$C_4$-alkyl; and wherein $R_9$ and $R_9'$ are as defined above; and a five- to seven-membered heterocyclic radical having at least one N-atom and being bound in each case via said nitrogen atom.

9. A composite material according to claim 8, wherein the non-ionic hydrophilic substituent is selected from the group consisting of a radical —COOY, wherein Y is $C_1$–$C_2$-alkyl, $C_2$–$C_3$-alkyl, which is substituted by hydroxy, amino or N,N-di-$C_1$–$C_2$-alkylamino, or is a radical —$C_2$–$C_4$-alkylene-NH—C(O)—O—G wherein —O—G is the radical of trehalose or a cyclodextrin fragment with 1 to 8 sugar units each; a radical —CO—$NY_1Y_2$, wherein $Y_1$ and $Y_2$ are each independently of the other hydrogen or $C_1$–$C_4$-alkyl which is unsubstituted or substituted by hydroxy, or $Y_1$ and $Y_2$ together with the adjacent N-atom form a N—$C_1$–$C_2$-alkylpiperazino or morpholino ring; or a heterocyclic radical selected from the group consisting of N-pyrrolidonyl, 2- or 4-pyridinyl, 2-methylpyridin-5-yl, 2-, 3- oder 4-hydroxypyridinyl, N-ε-capro-lactamyl, N-imidazolyl, 2-methylimidazol-1-yl, N-morpholinyl and 4-N-methylpiperazin-1-yl.

10. A composite material according to claim 1, wherein the hydrophilic substituent of B or B' is an anionic substituent selected from the group consisting of $C_1$–$C_6$-alkyl which is substituted by —$SO_3H$, —$OSO_3H$, —$OPO_3H_2$—COOH or by a radical —NH—C(O)—O—G' wherein G' is the radical of lactobionic acid, hyaluronic acid or sialic acid; phenyl which is substituted by one or more same or different substituents selected from the group consisting of —$SO_3H$, —COOH, —OH and —$CH_2$—$SO_3H$; —COOH; a radical —$COOY_4$, wherein $Y_4$ is $C_1$–$C_{24}$-alkyl which is substituted by —COOH, —$SO_3H$, —$OSO_3H$, or —$OPO_3H_2$; a radical —$CONY_5Y_6$ wherein $Y_5$ is $C_1$–$C_{24}$-alkyl which is substituted by —COOH, —$SO_3H$, —$OSO_3H$, or —$OPO_3H_2$ and $Y_6$ independently has the meaning of $Y_5$ or is hydrogen or $C_1$–$C_{12}$-alkyl; or —$SO_3H$; and a salt thereof.

11. A composite material according to claim 1, wherein the hydrophilic substituent of B or B' is a cationic substituent selected from the group consisting of $C_1$–$C_{12}$-alkyl which is substituted by a radical —$NR_9R_9'R_9''^+An^-$, wherein $R_9$, $R_9'$ and $R_9''$ are each independently of another hydrogen or unsubstituted or hydroxy-substituted $C_1$–$C_6$-alkyl or phenyl, and $An^-$ is an anion; and a radical —$C(O)OY_7$, wherein $Y_7$ is $C_1$–$C_{24}$-alkyl which is substituted by —$NR_9R_9'R_9''^+An^-$ and is further unsubstituted or substituted for example by hydroxy, wherein $R_9$, $R_9'$, $R_9''$ and $An^-$ are as defined above.

12. A composite material according to claim 1, wherein the hydrophilic substituent of B or B' is a zwitterionic substituent which is a radical of formula —C(O)O—(alk''')—N(R$_9$)$_2^+$—(alk')—An$^-$ or —C(O)O—(alk'')—O—PO$_2^-$—(O)$_{0-1}$—(alk''')—N(R$_9$)$_3^+$ wherein alk' is $C_1$–$C_{12}$-alkylene, (alk'') is $C_2$–$C_{24}$-alkylene which is unsubstituted or substituted by hydroxy or by a radical —OY$_8$, Y$_8$ is hydrogen or the acyl radical of a carboxylic acid, (alk''') is $C_2$–$C_8$-alkylene, R$_9$ is hydrogen or $C_1$–$C_6$-alkyl, and An$^-$ is an anion.

13. A composite material according to claim 8, wherein B is a radical of formula

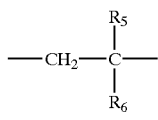

(4a)

or

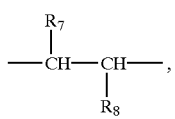

(4b)

wherein R$_5$ is hydrogen or $C_1$–$C_4$-alkyl; R$_6$ is a hydrophilic substituent selected from the group consisting of a radical $C_1$–$C_6$-alkyl which is substituted by one or more same or different substituents selected from the group consisting of —OH, $C_1$–$C_4$-alkoxy and —NR$_9$R$_9$', wherein R$_9$ and R$_9$' are each independenty of another hydrogen or unsubstituted or hydroxy-substituted $C_1$–$C_6$-alkyl or phenyl; phenyl which is substituted by hydroxy, $C_1$–$C_4$-alkoxy or —NR$_9$R$_9$', wherein R$_9$ and R$_9$' are as defined above; a radical —COOY wherein Y is $C_1$–$C_{24}$-alkyl which is unsubstituted or substituted by hydroxy, $C_1$–$C_4$-alkoxy, —O—Si(CH$_3$)$_3$, —NR$_9$R$_9$' wherein R$_9$ and R$_9$' are as defined above, a radical —O—(CH$_2$CH$_2$O)$_{1-24}$—E wherein E is hydrogen or $C_1$–$C_6$-alkyl, or a radical —NH—C(O)—O—G, wherein —O—G is the radical of a saccharide with 1 to 8 sugar units or is a radical —O—(CH$_2$CH$_2$O)$_{1-24}$—E, wherein E is as defined above, or Y is $C_5$–$C_8$-cycloalkyl which is unsubstituted or substituted by $C_1$–$C_4$-alkyl or $C_1$–$C_4$-alkoxy, or is unsubstituted or $C_1$–$C_4$-alkyl- or $C_1$–$C_4$-alkoxy-substituted phenyl or $C_7$–$C_{12}$-aralkyl; —CONY$_1$Y$_2$ wherein Y$_1$ and Y$_2$ are each independently hydrogen, $C_1$–$C_{12}$-alkyl, which is unsubstituted or substituted for example by hydroxy, $C_1$–$C_4$-alkoxy or a radical —O—(CH$_2$CH$_2$O)$_{1-24}$—E wherein E is as defined above, or Y$_1$ and Y$_2$ together with the adjacent N-atom form a five- or six-membered heterocyclic ring having no additional heteroatom or one additional oxygen or nitrogen atom; a radical —OY$_3$ wherein Y$_3$ is hydrogen; or $C_1$–$C_{12}$-alkyl which is unsubstituted or substituted by —NR$_9$R$_9$'; or is a radical —C(O)—$C_1$–$C_4$-alkyl; and wherein R$_9$ and R$_9$' are as defined above; and a five- to seven-membered heterocyclic radical having at least one N-atom and being bound in each case via said nitrogen atom;

R$_7$ is $C_1$–$C_4$-alkyl, phenyl or a radical —C(O)OY$_9$, wherein Y$_9$ is hydrogen or unsubstituted or hydroxy-substituted $C_1$–$C_4$-alkyl; and R$_8$ is a radical —C(O)Y$_9$' or —CH$_2$—C(O)OY$_9$' wherein Y$_9$' independently has the meaning of Y$_9$; and B' independently has one of the meanings given above for B or is the radical of a hydrophobic comonomer.

14. A composite material according to claim 1, wherein (oligomer) denotes a radical of formula (3a), and the radical —(alk)—S—[B]$_p$—[B']$_q$—Q is a radical of formula

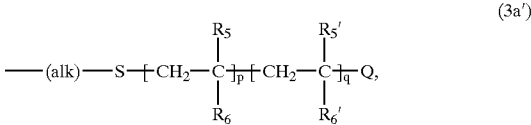

(3a')

wherein (alk) is $C_2$–$C_4$-alkylene, R$_5$ and R$_5$' are each independently hydrogen or methyl, Q is a monovalent group that is suitable to act as a polymerization chain-reaction terminator, p and q are each independently an integer from 0 to 100 wherein the total of (p+q) is an integer from 5 to 100, and R$_6$ and R$_6$' are each independently a radical —COOY, wherein Y is $C_1$–$C_4$-alkyl, $C_2$–$C_4$-alkyl, which is substituted by one or two substituents selected from the group consisting of hydroxy and —NR$_9$R$_9$' wherein R$_9$ and R$_9$' are each independently of another hydrogen or $C_1$–$C_2$-alkyl, or is a radical —CH$_2$CH$_2$—O—(CH$_2$CH$_2$—O)$_{1-12}$—E wherein E is hydrogen or $C_1$–$C_2$-alkyl, or is a radical —$C_2$–$C_4$-alkylene-NH—C(O)—O—G wherein —O—G— is the radical of trehalose or a cyclodextrin fragment with 1 to 8 sugar units each; a radical —CO—NY$_1$Y$_2$, wherein Y$_1$ and Y$_2$ are each independently of the other hydrogen or $C_1$–$C_4$-alkyl which is unsubstituted or substituted by hydroxy, or Y$_1$ and Y$_2$ together with the adjacent N-atom form a N—$C_1$–$C_2$-alkylpiperazino or morpholino ring; a heterocyclic radical selected from the group consisting of N-pyrrolidonyl, 2- or 4-pyridinyl, 2-methylpyridin-5-yl, 2-, 3-oder 4-hydroxypyridinyl, N-ε-caprolactamyl, N-imidazolyl, 2-methylimidazol-1-yl, N-morpholinyl and 4-N-methylpiperazin-1-yl; $C_1$–$C_2$-alkyl, which is substituted by one or more substituents selected from the group consisting of —SO$_3$H and —OPO$_3$H$_2$; phenyl which is substituted by —SO$_3$H or sulfomethyl; —COOH; a radical —COOY$_4$, wherein Y$_4$ is $C_2$–$C_6$-alkyl which is substituted by —COOH, —SO$_3$H, —OSO$_3$H or —OPO$_3$H$_2$; a radical —CONY$_5$Y$_6$ wherein Y$_5$ is $C_1$–$C_6$-alkyl substituted by sulfo, and Y$_6$ is hydrogen; or —SO$_3$H; or a suitable salt thereof.

15. A composite material according to claim 14, wherein p is an integer from 10 to 50, q is the number 0, R$_5$ is hydrogen and R$_6$ is —C(O)NH$_2$.

16. A composite material according to claim 14, wherein p is an integer from 10 to 50, q is the number 0, R$_5$ is methyl or hydrogen and R$_6$ is a radical —COO(CH$_2$)$_{2-4}$—NHC(O)—O—G wherein —O—G is the radical of trehalose.

17. A composite material according to claim 1, wherein the macromonomer applied to the hydrophilic surface and polymerized there is of formula

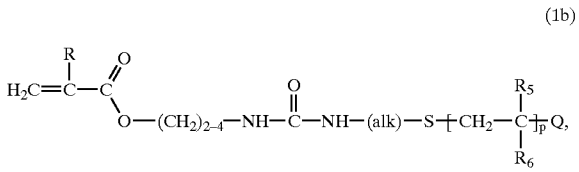

(1b)

wherein R is hydrogen or methyl, (alk) is $C_2$–$C_4$-alkylene, R$_5$ is hydrogen or methyl, p is an integer of 5 to 50, Q is a monovalent group that is suitable to act as a polymerization chain-reaction terminator, and R$_6$ is a radical —COO—$C_1$–$C_2$-alkyl, —COO—(CH$_2$)$_{2-4}$—OH, —CONH$_2$, —ON(CH$_3$)$_2$, —CONH—(CH$_2$)$_2$—OH,

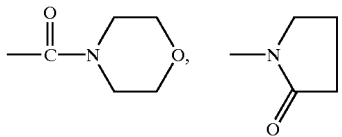

or —COO(CH$_2$)$_{2-4}$—NHC(O)—O—G wherein —O—G is the radical of trehalose or a cyclodextrin fragment with a maximum of 8 sugar units.

18. A composite material according to claim 1, wherein (oligomer) is a radical of the formula (3b) or (3b').

19. A composite material according to claim 1, wherein the polymerization of the macromonomers on the bulk material surface is initiated by the action of irradiation.

20. A composite material according to claim 19, wherein the polymerization is initiated by the action of UV radiation for a time period of 0.5 to 5 minutes.

21. A composite material according claim 1, wherein the hydrophilic surface coating is obtainable by grafting at least one macromonomer to the bulk material surface with formation of a bottle-brush structure composed of tethered chain.

22. A composite material according to claim 1, wherein the hydrophilic surface coating has a coating thickness of from 0.01 to 50 μm.

23. A process for the manufacture of a composite material according to claim 1, which comprises the steps:

(a) providing an inorganic or organic bulk material having covalently bonded on its surface polymerization initiator radicals;

(b) applying a coating of one or more different ethylenically unsaturated hydrophilic macromonomers of formula (1) according to claim 1 to the bulk material surface provided with the initiator radicals, and (c) polymerizing the coating of unsaturated hydrophilic macromonomers by irradiation.

24. A process according to claim 23, wherein the inorganic or organic bulk material is a biomedical device.

25. Biomedical device comprising a composite material according to claim 1.

26. Biomedical device according to claim 25 wherein the biomedical device is a contact lens, intraocular lens or artificial cornea.

27. Biomedical device according to claim 26, which is a contact lens and has a tear break up time (TBUT) of >15 seconds.

28. A composite material according to claim 1, wherein p and q in formula (3a) are each independently an integer from 0 to 100, wherein the total of (p+q) is an integer from 5 to 100.

29. A composite material according to claim 1, which is a biomedical device comprising a bulk material that comprises a polysiloxane, perfluoropolyether, fluorinated poly (meth)acrylate, polyalkyl(meth)acrylates, or fluorinated polyolefin.

30. A composite material according to claim 29, which is a contact lens, intraocular lens, or artificial cornea.

31. A composite material according to claim 1, wherein the initiator moieties are derived from a functional photoinitiator of formula

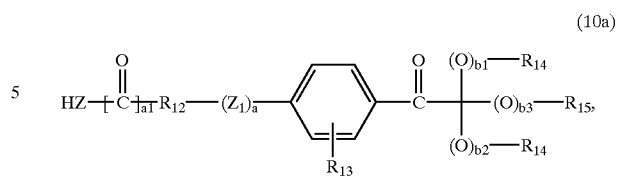

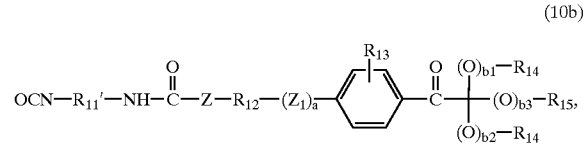

or

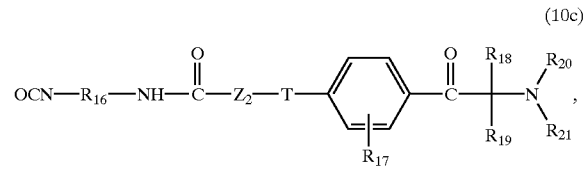

b1 and b2 are each 0;

Z and Z1 are each bivalent —O—;

b3 is 0 or 1;

R$_{14}$ is C$_1$–C$_4$-alkyl or phenyl, or both groups R$_{14}$ together are tetramethylene or pentamethylene;

R$_{15}$ is C$_1$–C$_4$-alkyl or H,

R$_{13}$ is hydrogen;

a and a1 are each independently 0 or 1;

R$_{12}$ is linear or branched C$_2$–C$_4$-alkylene, or is a direct bond, in which case a is 0;

R$_{11}$' is branched C$_5$–C$_{10}$-alkylene, phenylene or phenylene substituted by from 1 to 3 methyl groups, benzylene or benzylene substituted by from 1 to 3 methyl groups, cyclohexylene or cyclohexylene substituted by from 1 to 3 methyl groups, cyclohexyl-C$_y$H$_{2y}$— or —C$_y$H$_{2y}$-cyclohexyl-C$_y$H$_{2y}$— or cyclohexyl-C$_y$H$_{2y}$— or —C$_y$H$_{2y}$-cyclohexyl-C$_y$H$_y$— substituted by from 1 to 3 methyl groups, wherein y is 1 or 2;

T is bivalent —O—, —NH—, —S— or —(CH$_2$)$_y$— wherein y is an integer from 1 to 6;

Z$_2$ is a direct bond or —O—(CH$_2$)$_y$— wherein y is an integer from 1 to 6 and the terminal CH$_2$ group of which is linked to the adjacent T in formula (10c);

R$_{17}$ is H, C$_1$–C$_{12}$-alkyl or C$_1$–C$_{12}$-alkoxy;

R$_{18}$ is linear C$_1$–C$_8$-alkyl, C$_2$–C$_8$-alkenyl or C$_6$–C$_{10}$-aryl-C$_1$–C$_8$-alkyl;

R$_{19}$ independently of R$_{18}$ has the same definitions as R$_{18}$ or is C$_6$–C$_{10}$-aryl, or R$_{18}$ and R$_{19}$ together are —(CH$_2$)$_e$— wherein e is an integer from 2 to 6;

R$_{20}$ and R$_{21}$ are each independently of the other linear or branched C$_1$–C$_6$-alkyl that may be substituted by C$_1$–C$_4$-alkoxy, or C$_6$–C$_{10}$-aryl-C$_1$–C$_8$-alkyl or C$_2$–C$_8$-alkenyl; or R$_{20}$ and R$_{21}$ together are —(CH$_2$)$_{f1}$—Z$_3$—

$-(CH_2)_{f2}-$ wherein $Z_3$ is a direct bond, $-O-$, $-S-$ or $-NR_{26}-$, and $R_{26}$ is H or $C_1-C_8$-alkyl and f1 and f2 are each independently of the other an integer from 2 to 4; and $R_{16}$ is branched $C_6-C_{10}$-alkylene, phenylene or phenylene substituted by from 1 to 3 methyl groups, benzylene or benzylene substituted by from 1 to 3 methyl groups, cyclohexylene or cyclohexylene substituted by from 1 to 3 methyl groups, cyclohexylene-$CH_2-$ or cyclohexylene-$CH_2-$ substituted by from 1 to 3 methyl groups.

\* \* \* \* \*